US012699716B2

(12) United States Patent
Berchansky et al.

(10) Patent No.: US 12,699,716 B2
(45) Date of Patent: Aug. 4, 2026

(54) REDUCTION OF LATENCY IN RETRIEVER-READER ARCHITECTURES

(71) Applicant: Intel Corporation, Santa Clara, CA (US)

(72) Inventors: Moshe Berchansky, Giv'at Shmu'el (IL); Peter Izsak, Nesher (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/957,456

(22) Filed: Sep. 30, 2022

(65) Prior Publication Data

US 2023/0229682 A1 Jul. 20, 2023

(51) Int. Cl.
| | |
|---|---|
| *G06F 16/33* | (2025.01) |
| *G06F 16/3329* | (2025.01) |
| *G06F 16/951* | (2019.01) |
| *G06N 20/00* | (2019.01) |

(52) U.S. Cl.
CPC ........ *G06F 16/3329* (2019.01); *G06F 16/951* (2019.01); *G06N 20/00* (2019.01)

(58) Field of Classification Search
CPC .. G06F 16/3329; G06F 16/951; G06F 16/901; G06F 16/903; G06F 16/90332; G06F 16/2272; G06N 20/00; G06N 3/0455; G06N 3/0464; G06N 3/08
See application file for complete search history.

(56) References Cited

U.S. PATENT DOCUMENTS

2021/0295822 A1* 9/2021 Tomkins ............... G10L 15/197

OTHER PUBLICATIONS

Paliwal et al., "A Score Based Indexing Scheme for Palmprint Databases", Proceedings of 2010 IEEE 17th International Conference on Image Processing (Year: 2010).*
Amara et al., "Nearest neighbor search with compact codes: A decoder perspective", arXiv:2112.09568v2 (Year: 2022).*
Azarian et al. "Learned Threshold Pruning", arXiv:2003.00075 (Year: 2021).*
Yu et al., "KG-FiD: Infusing Knowledge Graph in Fusion-in-Decoder for Open-Domain Question Answering," May 22-27, 2022, 14 pages.
Wu et al., "Training Adaptive Computation for Open-Domain Question Answering with Computational Constraints," dated Aug. 1, 2021, 7 pages.

* cited by examiner

*Primary Examiner* — Qian Yang
(74) *Attorney, Agent, or Firm* — Hanley, Flight & Zimmerman, LLC

(57) ABSTRACT

Disclosed is a technical solution to reduce latency in reader-retriever architectures of an open domain query response system. An example apparatus is to reduce latency in a retriever-reader architecture comprising at least one memory, machine readable instructions, and processor circuitry to at least one of instantiate or execute the machine readable instructions to identify a query, the query having data associated with the query, create a data array based on the data associated with the query, and deploy a machine learning model. The machine learning model is to assign a score to an index of the data array based on a likelihood that a response to the query exists in the index, determine an action to perform on the index based on a comparison of the score and a ranking threshold, and produce the response from the data array based on the action.

25 Claims, 11 Drawing Sheets

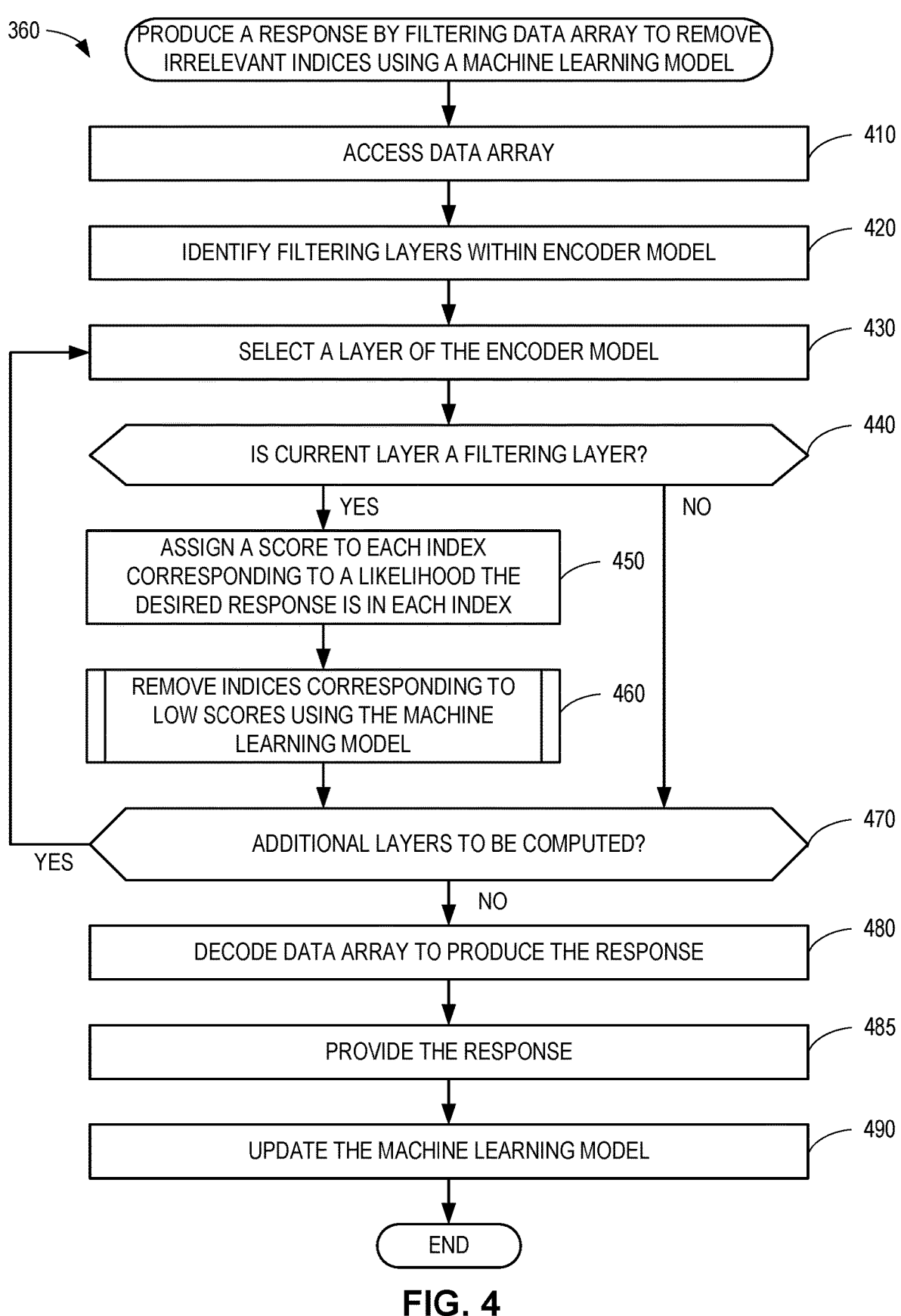

360

PRODUCE A RESPONSE BY FILTERING DATA ARRAY TO REMOVE IRRELEVANT INDICES USING A MACHINE LEARNING MODEL

ACCESS DATA ARRAY — 410

IDENTIFY FILTERING LAYERS WITHIN ENCODER MODEL — 420

SELECT A LAYER OF THE ENCODER MODEL — 430

IS CURRENT LAYER A FILTERING LAYER? — 440

YES

ASSIGN A SCORE TO EACH INDEX CORRESPONDING TO A LIKELIHOOD THE DESIRED RESPONSE IS IN EACH INDEX — 450

REMOVE INDICES CORRESPONDING TO LOW SCORES USING THE MACHINE LEARNING MODEL — 460

NO

ADDITIONAL LAYERS TO BE COMPUTED? — 470

YES

NO

DECODE DATA ARRAY TO PRODUCE THE RESPONSE — 480

PROVIDE THE RESPONSE — 485

UPDATE THE MACHINE LEARNING MODEL — 490

END

FIG. 4

REDUCTION OF LATENCY IN RETRIEVER-READER ARCHITECTURES

FIELD OF THE DISCLOSURE

This disclosure relates generally to open domain query response systems and, more particularly, to methods and apparatus to reduce latency in reader-retriever architectures of the open domain query response systems.

BACKGROUND

Open domain query response systems utilize a retriever-reader architecture to retrieve evidence (e.g., a retriever model) from a non-parametric external memory (e.g., data-bases that routinely change size by adding or removing information) to generate a response by using a generator model (e.g., a reader model). The retriever model retrieves data from the external memory based on a query and then feeds that data into the reader model which generates a response to the query by analyzing the data retrieved.

BRIEF DESCRIPTION OF THE DRAWINGS

FIG. 4 is a flowchart representative of example machine readable instructions and/or example operations that may be executed by example processor circuitry to implement the example data filtering circuitry a of FIG. 2.

In general, the same reference numbers will be used throughout the drawing(s) and accompanying written description to refer to the same or like parts. The figures are not to scale.

Figure 1:
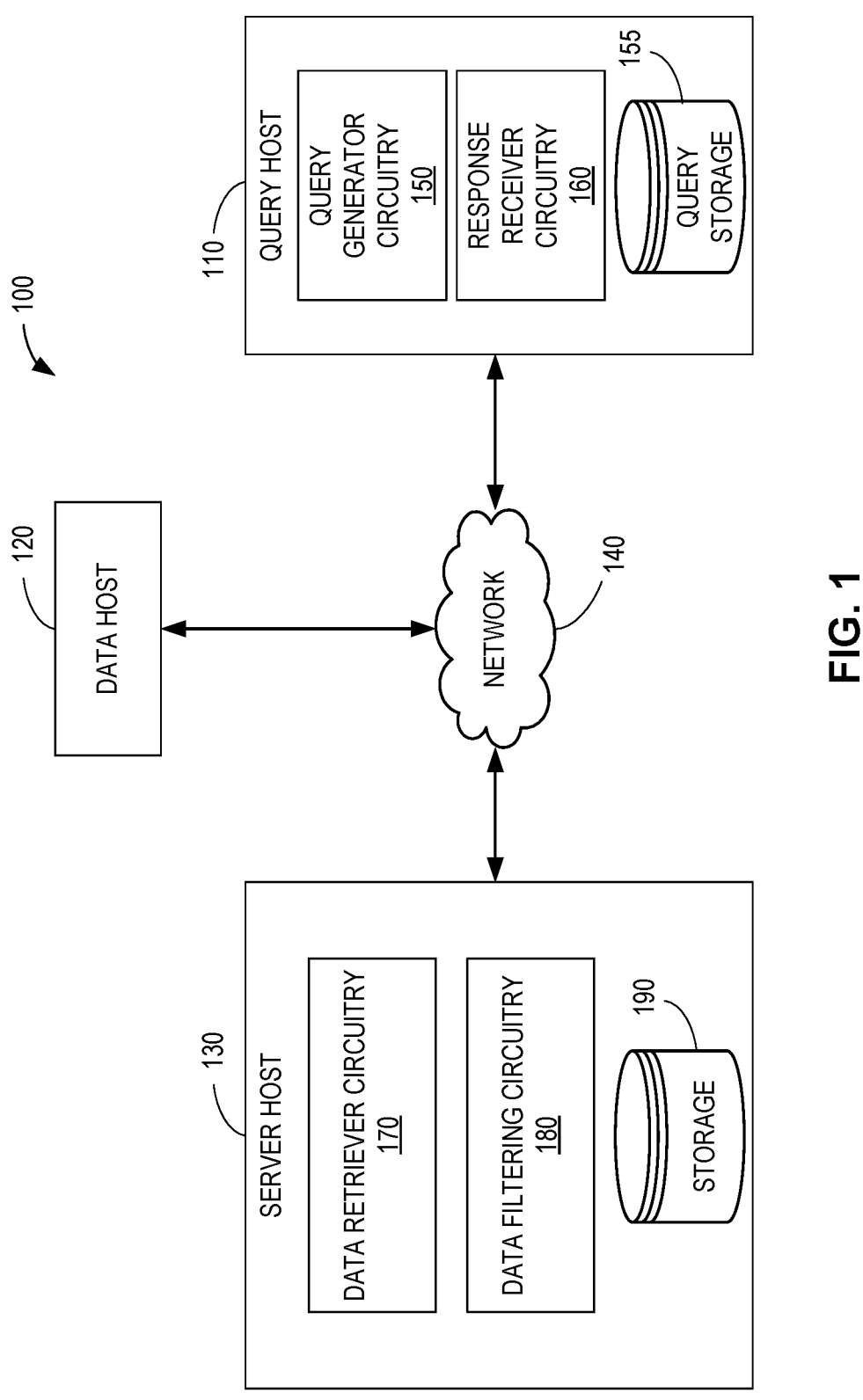
FIG. 1 is a schematic illustration of an example retriever-reader architecture.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, "approximately" and "about" modify their subjects/values to recognize the potential presence of variations that occur in real world applications. For example, "approximately" and "about" may modify dimensions that may not be exact due to manufacturing tolerances and/or other real world imperfections as will be understood by persons of ordinary skill in the art. For example, "approximately" and "about" may indicate such dimensions may be within a tolerance range of +/−10% unless otherwise specified in the below description.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmable with instructions to perform specific operations and including one or more semiconductor-based logic devices (e.g., electrical hardware implemented by one or more transistors). Examples of processor circuitry include programmable microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of processor circuitry is/are best suited to execute the computing task(s).

DETAILED DESCRIPTION

Current open domain query response systems utilize a retriever-reader architecture to retrieve evidence (e.g., a retriever model) from a non-parametric external memory (e.g., databases that routinely change size by adding or removing information) to generate a response by using a generator model (e.g., a reader model). This type of retriever-reader architecture is subject to high latency (about 1 second from query submitted to response provided) for the response due to the volume of data the generator model must parse to generate the response.

Since the purpose of open domain query response systems is to generate a high-quality response (e.g., little doubt that the response provided by the reader model is incorrect), the reader model must parse most of the data retrieved by the retriever model to avoid bypassing data that does have the desired response.

Open domain query response systems utilize large generative encoder-decoder models and machine learning models (e.g., convolutional neural networks) to generate a high-quality response from the large amount of data retrieved. To appropriately parse the large volume of data, the neural networks need to be complex and thus require more computational power. This additional computational power, on top of the computational power needed to parse the large volume of data, leads to high latency for the response from the reader model.

Filtering the data retrieved by the retriever model has been attempted in the art, but current solutions still have high latency time because of the complexity of the filtering models needed to filter out data not containing the desired response. Alternate attempts to filter out data by sequential filtering still leads to high latency because of the inefficiency and instability of the sequential filtering (such that this method is not scalable to larger-scale data sets to maintain a lower latency).

Therefore, there exists a need for a reader-retriever architecture that reduces latency in generating a response to a query while being able to scale to larger data sets and learn.

FIG. 1 is a schematic illustration of an example retriever-reader architecture 100. The retriever-reader architecture 100 includes a query host 110, a data host 120, a server host 130, and a network 140. The query host 110, the data host 120, and the server host 130 communicate via the network 140. The network 140 can be any one of or combination of a public network, a Virtual Private Network (VPN), a private network, or any other similar communication platform to enable two or more computing devices to communicate.

The query host 110 of the illustrated example of FIG. 1 includes query generator circuitry 150, query storage 155, and response receiver circuitry 160. In some examples, the query generator circuitry 150 and the response receiver circuitry 160 communicate with the server host 130 and the data host 120 via the network 140.

The query generator circuitry 150 identifies a query based on an input from a user, computing device, algorithm, or more generally, an asker desiring a response. In some examples, the response is provided in a natural language. In some examples, the user can input the query into a user interface (such as a text field on a website, where the user inputs a natural language query such as "why is the sky blue?") and the query generator circuitry 150 sends the query to the server host 130 over the network 140. In other examples, the query generator circuitry 150 stores the query on a query storage 155 which the server host 130 can access via the network 140.

As used herein, a query includes a string of text, an image, an audio clip, an arrangement of binary bits (e.g., 1's and 0's), a hexadecimal code, etc. that elicits a response. As such, the query can be represented in any way that arranges the query into computer readable code that is used to determine a response. As used herein, a response includes a string of text, an image, an audio clip, an arrangement of binary bits, a hexadecimal code, etc. that responds to the query. As such, the response can be represented in the same, or different, manner in which the query was received.

The response receiver circuitry 160 outputs a response to the query identified by the query generator circuitry 150. In some examples, the response is output by the response receiver circuitry 160 to the same user interface (e.g., the website the user inputted the query into) that was used to establish the query. In other examples, the response may be saved to a file within the query storage 155 in which the user, computing device, algorithm, or more generally, the asker, can access. In some examples, the response is generated by the server host 130 and sent to the query host over network 140 and then stored on the query storage 155, which the response receiver circuitry 160 can then access to output the response. In other examples, the response sent by the server host 130 is sent directly to the response receiver circuitry 160 to output the response and is not stored on the query storage 155.

The data host 120 of the illustrated example of FIG. 1 includes data which the server host 130 accesses to generate the response to the query identified by the query host 110. In some examples, the data host 120 includes external data from big data sources which are either open source or licensed by the accessor of the data host 120. In some examples, the data host 120 can include data owned by the accessor of the data host 120 (e.g., housed within internal servers/databased). In some examples, the data accessed by the server host 130 is retrieved from the data host 120 over the network 140.

The server host 130 of the illustrated example of FIG. 1 includes a data retriever circuitry 170, a data filtering circuitry 180, and a storage 190. In some examples, the data retriever circuitry 170 and the data filtering circuitry 180 communicate with the query host 110 and the data host 120 over the network 140.

The data retriever circuitry 170 accesses the data on the data host 120 and creates a data array based on the query to send to the data filtering circuitry 180. In some examples, the data retriever circuitry 170 communicates with the data host 120 and the query host 110 via the network 140.

The data array includes an arrangement of the data retrieved from the data host 120 into a format to be used by the data filtering circuitry 180. In the examples described herein, the data array includes an array, vector, list, matrix, image, audio file, etc. representing potential responses to the query. In the examples disclosed herein, each index of the data array is represented by the same length of data. In such an example, some indices of the data array may represent a smaller data size than other indices, and the smaller indices are normalized to make all indices the same data length (e.g., the unused space in the smaller data sized index is changed to include data to make the length of the smaller data sized index the same as the largest data sized index). While the examples described herein refer to the data array being an array, any other example representation and/or data structure may be interchangeably used herein to represent the data array (such as comma separated values (csv), optimized row columnar (orc), a hash, a database structure, etc.).

The data filtering circuitry 180 of the illustrated example of FIG. 1 generates the response to the query, given the retrieved data, and filters out data from the data array that is not likely to be relevant to the query. In some examples, the data array may be very large (e.g., includes more than 100 potential responses to the query) and the data filtering circuitry 180 filters out indices in the data array that have a low likelihood of containing the desired response to the query. In some examples, the filtering out of the data from the data array with the low likelihood of containing the desired response may be accomplished by a machine learning model (e.g., a multi-layered neural network). Filtering out data from the data array helps speed up computation time and reduce latency in outputting the response to the query, especially where the query is complex and requires a large sampling of data to determine the response.

The storage 190 of the illustrated example of FIG. 1 stores data retrieved from the data host 120 and stores the response to the query. In some examples, it may be desired to optimize the data filtering circuitry 180 to further reduce latency in outputting the response. In such an example, the data filtering circuitry 180 may access previously responded queries and/or data from the data host 120 that is stored on the storage 190 to assist in updating the machine learning model used by the data filtering circuitry 180 to filter out data from the data array that has the low likelihood of being relevant to the query.

Figure 2:
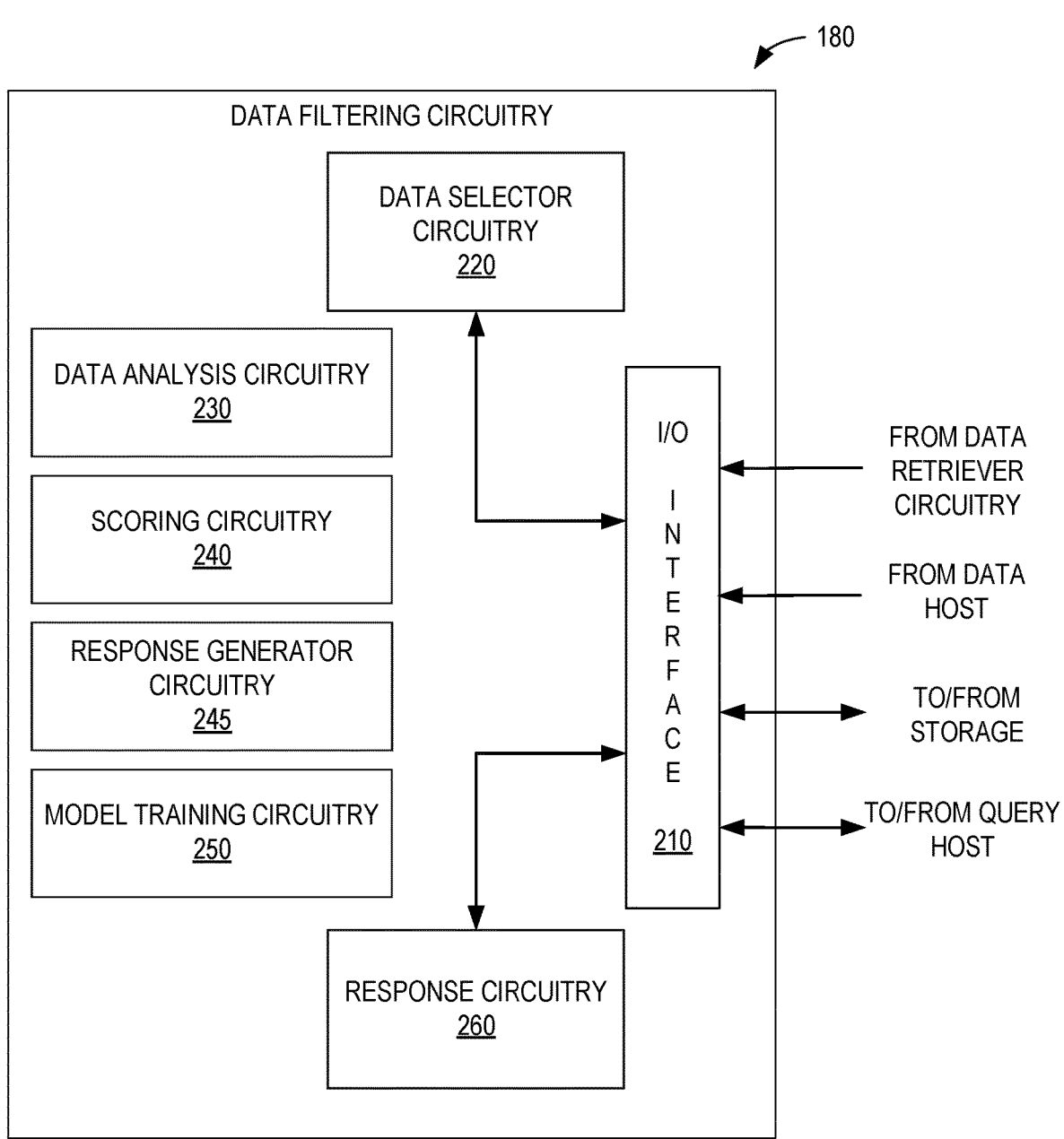
FIG. 2 is a block diagram of an example data filtering circuitry of FIG. 1.

FIG. 2 is a block diagram representing an example implementation of the data filtering circuitry 180 of FIG. 1. The data filtering circuitry 180 of FIG. 2 may be instantiated (e.g., creating an instance of, bring into being for any length of time, materialize, implement, etc.) by processor circuitry such as a central processing unit executing instructions. Additionally or alternatively, the data filtering circuitry 180 of FIG. 2 may be instantiated (e.g., creating an instance of, bring into being for any length of time, materialize, implement, etc.) by an ASIC or an FPGA structured to perform operations corresponding to the instructions. It should be understood that some or all of the circuitry of FIG. 2 may, thus, be instantiated at the same or different times. Some or all of the circuitry may be instantiated, for example, in one or more threads executing concurrently on hardware and/or in series on hardware. Moreover, in some examples, some or all of the circuitry of FIG. 2 may be implemented by microprocessor circuitry executing instructions to implement one or more virtual machines and/or containers.

The data filtering circuitry 180 of the illustrated example of FIG. 2 includes an I/O interface 210, a data selector circuitry 220, a data analysis circuitry 230, a scoring circuitry 240, a response generator circuitry 245, a model training circuitry 250, and a response circuitry 260.

The data selector circuitry 220 accesses the data array, or more generally, the data, from the data retriever circuitry 170. The data selector circuitry 220 communicates with the data receiver circuitry 170 through the I/O interface 210 to access the data array. In some examples, the data selector circuitry 220 may access data through the I/O interface 210 from the storage 190 on the server host 130. In some examples, the data selector circuitry 220 may access data directly from the data host 120 through the I/O interface 210. In some examples, the data selector circuitry 220 may receive data directly from the query host 110 through the I/O interface 210. In some examples, the data selector circuitry 220 is instantiated by processor circuitry executing data selector instructions and/or configured to perform operations such as those represented by the flowcharts of FIGS. 3 and/or 4.

In some examples, the data filtering circuitry 180 includes means for accessing data. For example, the means for accessing may be implemented by the data selector circuitry 220. In some examples, the data selector circuitry 220 may be instantiated by processor circuitry such as the example processor circuitry 712 of FIG. 7. For instance, the data selector circuitry 220 may be instantiated by the example microprocessor 800 of FIG. 8 executing machine executable instructions such as those implemented by at least blocks 350 of FIGS. 3 and 410 and 420 of FIG. 4. In some examples, the data selector circuitry 220 may be instantiated by hardware logic circuitry, which may be implemented by an ASIC, XPU, or the FPGA circuitry 900 of FIG. 9 structured to perform operations corresponding to the machine readable instructions. Additionally or alternatively, the data selector circuitry 220 may be instantiated by any other combination of hardware, software, and/or firmware. For example, the data selector circuitry 220 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

The data analysis circuitry 230 removes/filters indices from the data array that are less likely to be relevant to the query. In some examples, the data analysis circuitry 230 is instantiated by processor circuitry executing data analysis instructions and/or configured to perform operations such as those represented by the flowcharts of FIGS. 3, 4, and/or 5.

In some examples, the data filtering circuitry 180 includes means for removing data from the data array. For example, the means for removing may be implemented by the data analysis circuitry 230. In some examples, the data analysis circuitry 230 may be instantiated by processor circuitry such as the example processor circuitry 712 of FIG. 7. For instance, the data analysis circuitry 230 may be instantiated by the example microprocessor 800 of FIG. 8 executing machine executable instructions such as those implemented by at least blocks 350 of FIGS. 3, 430, 440, 460, and 470 of FIG. 4, and 510, 520, 530, 532, 534, and 540 of FIG. 5. In some examples, the data analysis circuitry 230 may be instantiated by hardware logic circuitry, which may be implemented by an ASIC, XPU, or the FPGA circuitry 900 of FIG. 9 structured to perform operations corresponding to the machine readable instructions. Additionally or alternatively, the data analysis circuitry 230 may be instantiated by any other combination of hardware, software, and/or firmware. For example, the data analysis circuitry 230 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

The scoring circuitry 240 assigns a score to each index of the data array, which indicates how relevant a given index is to the query. In some examples, the scoring circuitry 240 is instantiated by processor circuitry executing scoring instructions and/or configured to perform operations such as those represented by the flowcharts of FIGS. 3 and/or 4.

In some examples, the data filtering circuitry 180 includes means for assigning a score to each index of the data array. For example, the means for assigning may be implemented by the scoring circuitry 240. In some examples, the scoring circuitry 240 may be instantiated by processor circuitry such as the example processor circuitry 712 of FIG. 7. For instance, the scoring circuitry 240 may be instantiated by the example microprocessor 800 of FIG. 8 executing machine executable instructions such as those implemented by at least blocks 350 of FIG. 3 and 450 of FIG. 4. In some examples, the scoring circuitry 240 may be instantiated by hardware logic circuitry, which may be implemented by an ASIC, XPU, or the FPGA circuitry 900 of FIG. 9 structured to perform operations corresponding to the machine readable instructions. Additionally or alternatively, the scoring circuitry 240 may be instantiated by any other combination of hardware, software, and/or firmware. For example, the scoring circuitry 240 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

The response generator circuitry 245 produces the response to the query. In In some examples, the response generator circuitry 245 is instantiated by processor circuitry executing model training instructions and/or configured to perform operations such as those represented by the flowcharts of FIGS. 3 and/or 4.

In some examples, the data filtering circuitry 180 includes means for producing a response to a query. For example, the means for producing may be implemented by the response generator circuitry 245. In some examples, the response generator circuitry 245 may be instantiated by processor circuitry such as the example processor circuitry 712 of FIG. 7. For instance, the response generator circuitry 245 may be instantiated by the example microprocessor 800 of FIG. 8 executing machine executable instructions such as those implemented by at least blocks 350 of FIG. 3 and 480 of FIG. 4. In some examples, the response generator circuitry 245 may be instantiated by hardware logic circuitry, which may be implemented by an ASIC, XPU, or the FPGA circuitry 900 of FIG. 9 structured to perform operations corresponding to the machine readable instructions. Additionally or alternatively, the response generator circuitry 245 may be instantiated by any other combination of hardware, software, and/or firmware. For example, the response generator circuitry 245 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

The model training circuitry 250 updates the machine learning model. Additionally, the model training circuitry 250 amends a size of the data array based on the data removed by the data analysis circuitry 230. In some examples, the model training circuitry 250 is instantiated by processor circuitry executing model training instructions and/or configured to perform operations such as those represented by the flowcharts of FIGS. 3, 4, and/or 5.

In some examples, the data filtering circuitry 180 includes means for updating the machine learning model. For example, the means for updating may be implemented by the model training circuitry 250. In some examples, the model training circuitry 250 may be instantiated by processor circuitry such as the example processor circuitry 712 of FIG. 7. For instance, the model training circuitry 250 may be instantiated by the example microprocessor 800 of FIG. 8 executing machine executable instructions such as those implemented by at least blocks 350 of FIG. 3,490 of FIG. 4, and 550 of FIG. 5. In some examples, the model training circuitry 250 may be instantiated by hardware logic circuitry, which may be implemented by an ASIC, XPU, or the FPGA circuitry 900 of FIG. 9 structured to perform operations corresponding to the machine readable instructions. Additionally or alternatively, the model training circuitry 250 may be instantiated by any other combination of hardware, software, and/or firmware. For example, the model training circuitry 250 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the means for updating the machine learning model include means for amending the size of the data array.

The response circuitry 260 provides the response. In some examples, the response circuitry 260 communicates with the query host 110 via the I/O interface 210. In some examples, the response circuitry 260 communicates with the storage 190 to send data through the I/O interface 210. In some examples, the response circuitry 260 is instantiated by processor circuitry executing response instructions and/or configured to perform operations such as those represented by the flowcharts of FIGS. 3 and/or 4.

In some examples, the data filtering circuitry 180 includes means for providing the response. For example, the means for producing may be implemented by the response circuitry 260. In some examples, the response circuitry 260 may be instantiated by processor circuitry such as the example processor circuitry 712 of FIG. 7. For instance, the response circuitry 260 may be instantiated by the example microprocessor 800 of FIG. 8 executing machine executable instructions such as those implemented by at least blocks 350 of FIG. 3 and 485 of FIG. 4. In some examples, the response circuitry 260 may be instantiated by hardware logic circuitry, which may be implemented by an ASIC, XPU, or the FPGA circuitry 900 of FIG. 9 structured to perform operations corresponding to the machine readable instructions. Additionally or alternatively, the response circuitry 260 may be instantiated by any other combination of hardware, software, and/or firmware. For example, the response circuitry 260 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

While an example manner of implementing the data filtering circuitry 180 of FIG. 1 is illustrated in FIG. 2, one or more of the elements, processes, and/or devices illustrated in FIG. 2 may be combined, divided, re-arranged, omitted, eliminated, and/or implemented in any other way. Further, the example data selector circuitry 220, the example data analysis circuitry 230, the example scoring circuitry 240, the example response generator circuitry 245, the example model training circuitry 250, the example response circuitry 260, and/or, more generally, the example data filtering circuitry 180 of FIG. 1, may be implemented by hardware alone or by hardware in combination with software and/or firmware. Thus, for example, any of the example data selector circuitry 220, the example data analysis circuitry 230, the example scoring circuitry 240, the example response generator circuitry 245, the example model training circuitry 250, the example response circuitry 260, and/or, more generally, the example data filtering circuitry 180, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC (s)), programmable logic device(s) (PLD(s)), and/or field programmable logic device(s) (FPLD(s)) such as Field Programmable Gate Arrays (FPGAs). Further still, the example data filtering circuitry 180 of FIG. 1 may include one or more elements, processes, and/or devices in addition to, or instead of, those illustrated in FIG. 2, and/or may include more than one of any or all of the illustrated elements, processes and devices.

Figure 3:
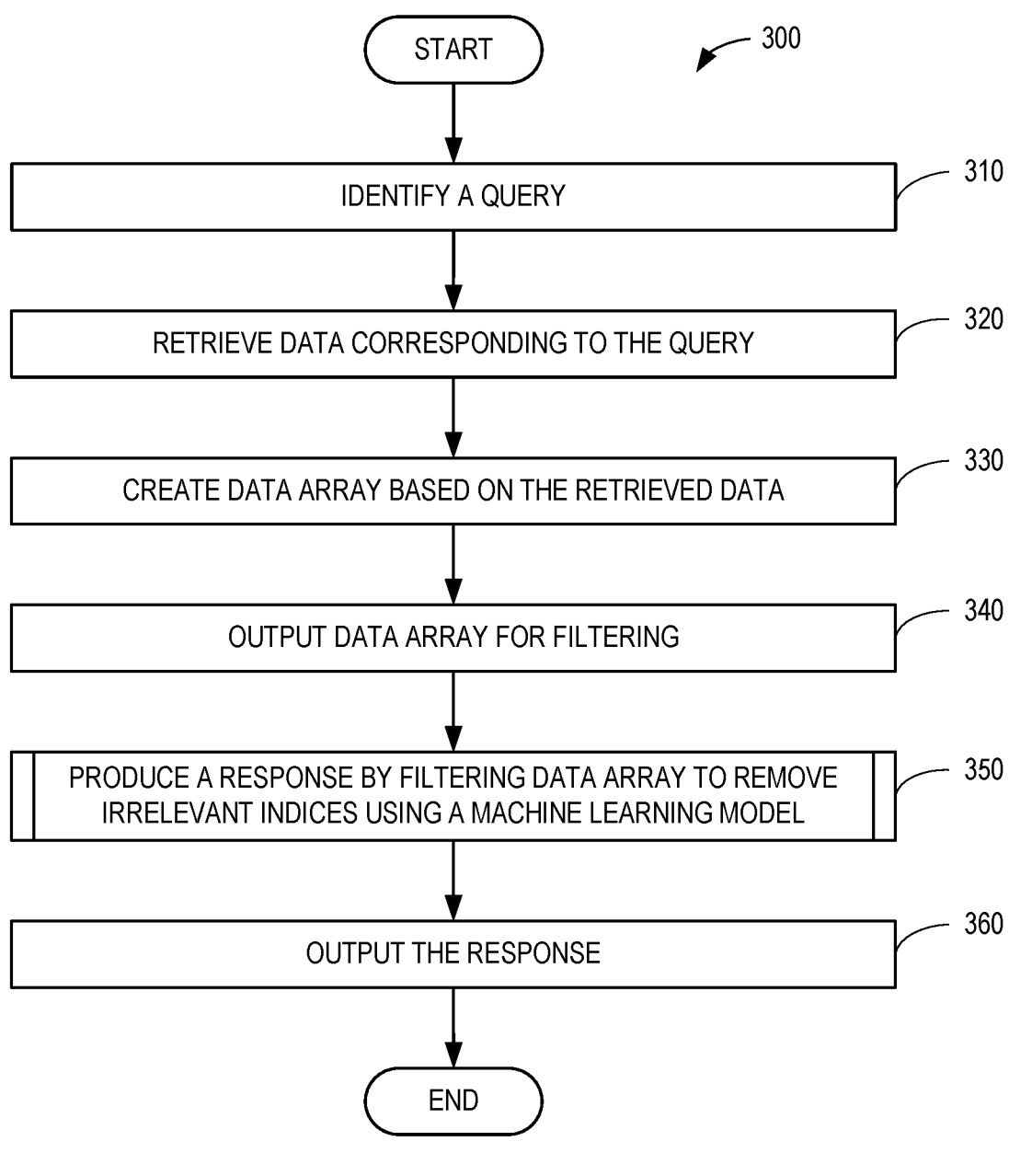
FIG. 3 is a flowchart representative of example machine readable instructions and/or example operations that may be executed by example processor circuitry to implement the example retriever-reader architecture of FIG. 1.

Flowcharts representative of example machine readable instructions, which may be executed to configure processor circuitry to implement the data filtering circuitry 180 of FIG. 2, is shown in FIGS. 3, 4, and/or 5. The machine readable instructions may be one or more executable programs or portion(s) of an executable program for execution by processor circuitry, such as the processor circuitry 712 shown in the example processor platform 700 discussed below in connection with FIG. 7 and/or the example processor circuitry discussed below in connection with FIGS. 8 and/or 9. The program may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program is described with reference to the flowcharts illustrated in FIGS. 3, 4, and/or 5, many other methods of implementing the example data filtering circuitry 180 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU, an XPU, etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 3, 4, and/or 5 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium, non-transitory computer readable storage medium, non-transitory machine readable medium, and non-transitory machine readable storage medium are expressly defined to include any type of computer readable storage device and/or storage disk and to exclude propagating signals and to exclude transmission media. As used herein, the terms "computer readable storage device" and "machine readable storage device" are defined to include any physical (mechanical and/or electrical) structure to store information, but to exclude propagating signals and to exclude transmission media. Examples of computer readable storage devices and machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer readable instructions, machine readable instructions, etc.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 3 is a flowchart representative of example machine readable instructions and/or example operations that may be executed and/or instantiated by processor circuitry to implement the example retriever-reader architecture 100 of FIG. 1. The example retriever-reader process 300 of FIG. 3 begin at block 310, at which the query generator circuitry 150 identifies a query that elicits a response. In some examples, the query is asked by a user inputting the query into a query asking field such as a text field on a website. In other examples, a computing device (such as an artificial intelligence (AI) program, static computer script, etc.) may establish the query. As described herein, the query may include a string of text, an image, an audio file, an arrangement of binary bits (e.g., 1's and 0's), a hexadecimal code, and/or any other data structure.

Once the query is identified by the query generator circuitry 150, the data retriever circuitry 170 retrieves data from the data host 120 corresponding to the query. (Block 320). In some examples, the data retriever circuitry 170 may include a timeout limiter for searching for relevant data (such as a 0.25 second timeout for example) to limit the time searching for data. In other examples, the data retriever circuitry 170 adapts to the query such that a less complex query requires less data, and the data retriever circuitry 170 therefore retrieves less data from the data host 120.

Once the data retriever circuitry 170 retrieves the data, the data retriever circuitry 170 creates the data array including the data retrieved. (Block 330). In some examples, in order to limit the amount of data processed by the data filtering circuitry 180, the data retriever circuitry 170 may cap the amount of indices in the data array (such as 100 indices for example). In other examples, the query may require more indices in the data array to accurately generate the response.

After the data array has been created by the data retriever circuitry 170, the data retriever circuitry 170 then outputs the data array for filtering. (Block 340). In some examples, the data filtering circuitry 180 accesses the data array output by the data retriever circuitry 170 to filter out irrelevant data from the data array.

Once the data retriever circuitry outputs the data array, the data filtering circuitry 180 then produces a response by filtering out indices in the data array that are less likely to be relevant to the query. (Block 350). In some examples, the data filtering circuitry 180 employs a machine learning model (e.g., a convolutional neural network) to filter out the irrelevant indices from the data array. In some examples, the machine learning model learns from previous cycles (e.g., from identifying the query to outputting the response) to become faster at producing the response. Further information with respect to the data filtering circuitry 180 is detailed in referenced to FIGS. 4, 5, and/or 6 below.

Once the response has been produced by the data filtering circuitry 180, the response receiver circuitry 160 outputs the response. (Block 360). In some examples, the response is displayed/presented on the same interface the user used to establish the query (e.g., a graphical user interface (GUI) on a computer display). In other examples, the response is stored in the storage 190 for use at a later time. Once the response has been output by the response receiver circuitry 160, the example retriever-reader process 300 ends. In some examples, the example retriever-reader process 300 can restart at the establishment of a new query.

FIG. 4 is a flowchart representative of example machine readable instructions and/or example operations that may be executed and/or instantiated by processor circuitry to implement the filtering of unrelated data indices of FIG. 3. The example machine learning filtering process 360 of FIG. 4 begin at block 410, where the data selector circuitry 220 accesses the data array from the data retriever circuitry 170. In some examples, the data selector circuitry 220 accesses the data array through the I/O interface 210 to communicate with the data retriever circuitry 170.

Once the data array has been accessed by the data selector circuitry 220, the data selector circuitry 220 then identifies the layers of an encoder model (e.g., the encoder model 620 of FIG. 6) in which filtering is desired. (Block 420). In some examples, the encoder model 620 is used to filter out unrelated indices from the data array.

The data selector circuitry performs an iteration across the number of filtering points, starting at i=$p_{exit}$, where $p_{exit}$ represents the number of filtering points, and decreasing until i=1, to determine which layers to perform the filtering on. In some examples, the starting index number (M) is representative of the total number of indices within the data array from the data retriever circuitry 170 and the final index number (m) may be any number of indices less than that of the starting index number (M). In the examples disclosed herein, the number of filtering points ($p_{exit}$) is less than the starting index number (M).

To determine the filtering rate of the data from the data array, a model of the filtering rate is employed by the machine learning model with a minimal amount of hyperparameters to reduce computation time. As shown in Equation 1 and Equation 2 below, the function $F_{t,k}(l)$ is modeled by a single hyperparameter constant k:

$$F_{k,t}(l) = \begin{cases} 1 - e^{-t(k)l}, & k < 0 \\ e^{-t(k)l}, & k > 0 \end{cases} \qquad \text{Equation 1}$$

$$t(k) = \begin{cases} -e^{k}, & k < 0 \\ e^{-k}, & k > 0 \end{cases} \qquad \text{Equation 2}$$

As shown in Equation 1, $F_{k,t}(l)$ utilizes the exponential calculation of Equation 2 to calculate a decay associated with the filtering of the data from the data array, where l represents the current layer of the encoder model 620. In the examples disclosed herein, the number of layers in the encoder model 620 is represented by l∈ [1, L], where L is the total number of layers in the encoder model 620. In some examples, the decay rate is determined by modifying a decay constant k, representative of a constant, to increase or decrease the amount of decay and the position in which the decay occurs along the layers of the encoder model 620. In some examples, a negative decay constant k results in a slower decay within beginning layers (e.g., layers 1-5) of the encoder model 620 (e.g., less data being filtered out of the data array in the beginning). In other examples, a positive decay constant k results in a faster decay within the beginning layers of the encoder model 620 (e.g., more data being filtered out of the data array in the beginning).

A normalization operation is then applied to the output of Equation 1, $F_{t,k}(1)$, to ensure the output is between the starting index number (M) and the final index number (m) as shown in Equation 3 and Equation 4 below, where y is the value of $F_{k,t}(l)$ at the current layer l of the encoder model 620, $y_{max}$ is a maximum value of $F_{k,t}(l)$, and $y_{min}$ is a minimum value of $F_{k,t}(l)$:

$$Norm(y; m, M) = (M - m)\frac{y - y_{min}}{y_{max} - y_{min}} + m \qquad \text{Equation 3}$$

$$f_{k,t}(l; m, M) = Norm(F_{k,t}(l); m, M) \qquad \text{Equation 4}$$

Since the filtering layer can be any layer of the encoder model 620, the machine learning model approximates $f_{k,t}(l)$ according to amount of filtering points $p_{exit}$. The difference between the starting index number (M) and the final index number (m) is divided into the filtering points $p_{exit}$ equal amounts, such that the number of indices removed at the filtering layer number i is specified in Equation 5 below:

$$\frac{M - m}{p_{exit}} * (i - 1) + m \qquad \text{Equation 5}$$

The layer of the encoder model 620 that performs the filtering is determined from the scaling/decay curve $f_{k,t}(l)$, since there is a one-to-one match between the number of indices to each layer of the encoder model 620. More information regarding the scaling/delay curve $f_{k,t}(l)$ is detailed below in reference to FIG. 6B.

Once the filtering layers have been identified by the data selector circuitry 220, the data analysis circuitry 230 then selects a current layer of the encoder model 620 to compute. (Block 430). In some examples, the total number of layers in the encoder model 620 is variable based on the machine learning model being used on the data array. As such, the instructions of block 430 are repeatable until every layer of the encoder model 620 has been computed.

After the data analysis circuitry 230 selects the current layer of the encoder model 620, the data analysis circuitry 230 then determines whether the current layer is a filtering layer. (Block 440). In some examples, the data analysis circuitry 230 utilizes the output of Equation 5 to determine the layer in which to filter, and if the current layer of the encoder model 620 matches with a filtering layer determined by the result of block 420, the resulting output of block 440 leads to a filtering of the current layer.

When the data analysis circuitry 230 determines that the current layer is a filtering layer (e.g., block 440 returns a result of YES), then the scoring circuitry 240 assigns a score to each index of the data array. (Block 450). In some examples, the score assigned to each index represents the likelihood that the desired response to the query is located in the index of the data array. In some examples, the score may be a percentage range from 0% to 100% likelihood that the desired response is within the given index. However, any other representation of a score may be used to illustrate the likelihood that the desired response exists within the index.

Once the scoring circuitry 240 assigns a score to each index in the data array, then the data analysis circuitry 230 removes indices from the data array corresponding to low scores. (Block 460). In some examples, the data analysis circuitry 230 defines a ranking threshold to be used to determine whether an index may contain the desired response. More detail regarding the removal of indices corresponding to low scores is further described in reference to FIG. 5 below.

Once the data analysis circuitry 230 removed indices corresponding to low scores have been removed or when the data analysis circuitry 230 determines that the current layer of the encoder model 620 is not a filtering layer (e.g., block 440 returns a result of NO), then the data analysis circuitry 230 determines whether additional layers of the encoder model 620 need to be computed. (Block 470). If the data analysis circuitry 230 determined that additional layers of the encoder model 620 need to be computed (e.g., block 470 returns a result of YES), then blocks 430 through 470 are repeated until no additional layers remain.

Once the data analysis circuitry 230 determines that no additional layers of the encoder model 620 remain to be computed (e.g., block 470 returns a result of NO), then the response generator circuitry 245 decodes the data array using a decoder model (e.g., the decoder model 630 of FIG. 6) and produces the response. (Block 480). In the examples described herein, the response generator circuitry 245 utilizes the decoder model 630 to take the resulting data array, once all filtering has been performed, and decode the data array to produce the response to be output by the response receiver circuitry 160.

Once the data array has been decoded by the response generator circuitry 245, then the response circuitry 260 provides the response. (Block 485). In some examples, the response is provided such that the response receiver circuitry 160 retrieves the response from the response circuitry 260 over the network 140 to output the response. In other examples, the response circuitry 260 provides the response to the response receiver circuitry 160 by sending the response directly to the response receiver circuitry 160 via the network 140.

Once the response has been provided by the response circuitry 260, then the model training circuitry 250 updates the machine learning model (e.g., the encoder model 620 and the decoder model 630) based on the response provided to the response circuitry 260. (Block 490). In some examples, the machine learning model may be updated based on an efficiency of the filtering process of the current query-response cycle (e.g., path from receiving a query to returning a response) and make adjustments based on the efficiency. Such learning may include updating the data retriever circuitry 170 to select more specific data (e.g., search for different keywords, narrow data selection sources, etc.), updating the exponential scaling/delay function of Equation 1 and 2 to filter out data from the data array at a different rate, etc. Once the machine learning model has been updated by the model training circuitry 250, the example machine learning filtering process 360 concludes.

Figure 5:
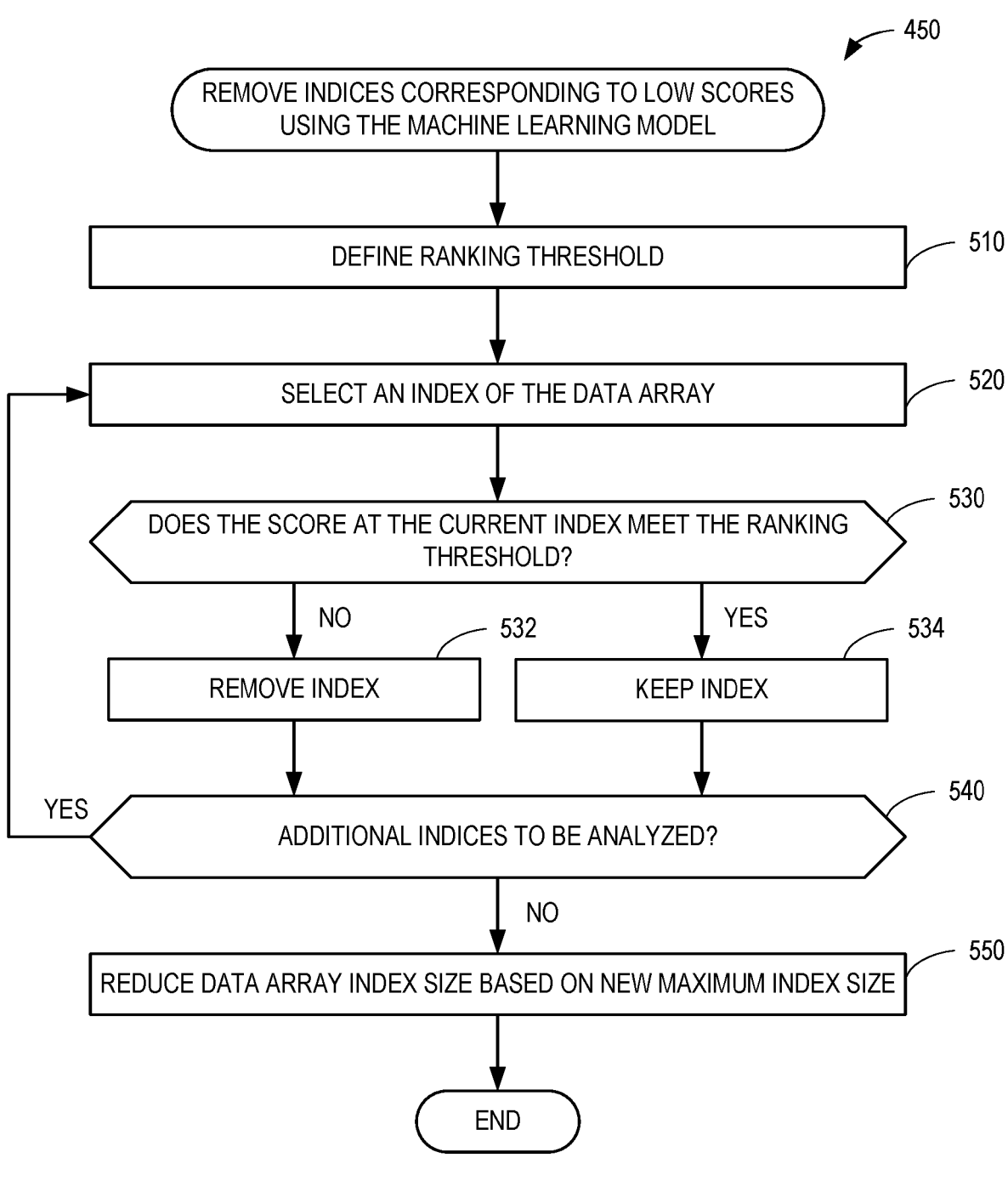
FIG. 5 is a flowchart representative of example machine readable instructions and/or example operations that may be executed by example processor circuitry to implement the data analysis circuitry and model training circuitry of FIG. 2.

FIG. 5 is a flowchart representative of example machine readable instructions and/or example operations that may be executed and/or instantiated by processor circuitry to implement the removal of irrelevant data indices of FIG. 4. The example machine learning index removal process 450 of FIG. 5 begin at block 510, where the data analysis circuitry 230 defines a ranking threshold. In the examples disclosed herein, the ranking threshold is the threshold the score assigned by the scoring circuitry 240 (corresponding to block 450 of FIG. 4) must meet to be kept in the data array.

Once the ranking threshold has been defined by the data analysis circuitry 230, the data analysis circuitry 230 selects an index of the data array. (Block 520). In some examples, the data analysis circuitry 230 iterates sequentially through each index of the data array to compare the assigned score to the ranking threshold.

Once the data analysis circuitry 230 selects the index, the data analysis circuitry 230 determines whether the score at the index meets the ranking threshold. (Block 530). In some examples, the ranking threshold may change based on the scores assigned to each index of the data array. For example, the ranking threshold may be curved such that the top 10% of the data array is kept, regardless of the score assigned to each index.

When the data analysis circuitry 230 determines that the score at the current index does not meet the ranking threshold (e.g., block 530 returns a result of NO), the data analysis circuitry 230 removes the index from the data array. (Block 532). In some examples, the removal of the data array occurs sequentially, as each index of the data array is analyzed. In other examples, the removal of the index may occur after each index has been analyzed, such that the removal of the indices occurs within one operation (instead of the removal operation occurring with each index).

When the data analysis circuitry 230 determines that the score at the current index does meet the ranking threshold (e.g., block 530 returns a result of YES), the index is kept in the data array. (Block 534). In some examples, the instructions of block 534 include nothing more than a non-action, such that when the data analysis circuitry 230 determines that the score at the current index meets the ranking threshold, no action is taken on the index. In other examples, the index may be assigned a new location (e.g., a separate temporary data array), such that the index does not interfere with the remaining analysis.

When the data analysis circuitry 230 determines that the index is to be removed or when the data analysis circuitry 230 determines that the index is to be kept, then the data analysis circuitry 230 determines whether there are additional indices in the data array to be analyzed. (Block 540). When the data analysis circuitry 230 determines that there are additional indices to be analyzed (e.g., block 540 returns a result of YES), then the instructions of blocks 520 through 540 are repeated until no additional indices remain to be analyzed in the data array.

When the data analysis circuitry 230 determines that there are no additional indices that need to be analyzed (e.g., block 540 returns a result of NO), the model training circuitry 250 reduces a size of the data array to account for the removal of certain indices. (Block 550). In some examples, when an index is removed from the data array that represents a larger data sized index (such as, for example, a string longer than 100 characters), the total size of the data array is reduced to account for the removal of the larger data sized index. As stated above, each index of the data array is the same size, regardless of the actual size of the data contained within the index. Thus, by reducing the size of the data array when the large data sized index is removed as not being relevant to the query, then the amount of data the machine learning model must parse is reduced, thus reducing latency. Once the data array size has been reduced by the model training circuitry 250, then the example machine learning index removal process 450 ends.

Figure 6A:
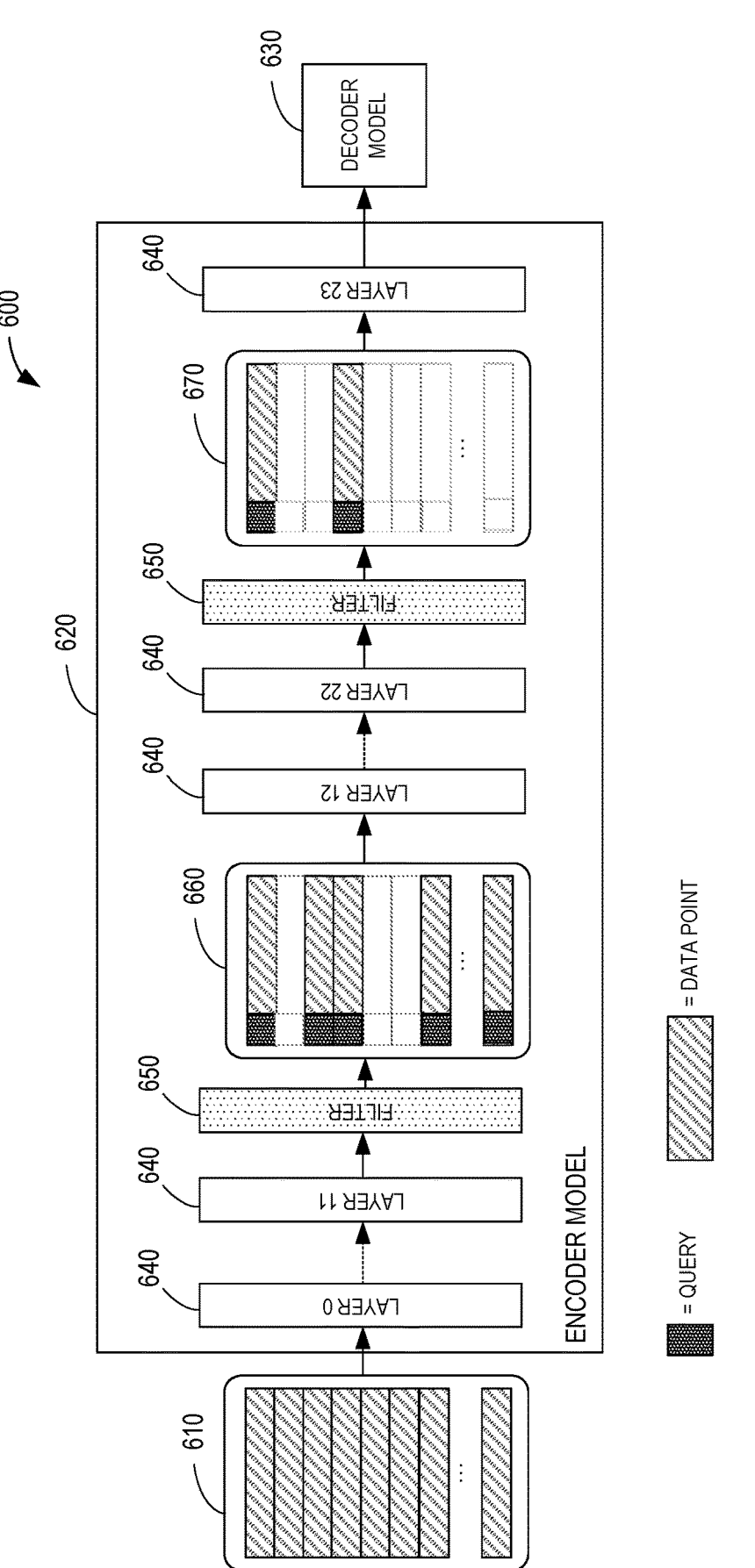
FIG. 6A is a schematic illustration of an example filtering process.

FIG. 6A is a schematic illustration of an example filtering process using an encoder and a decoder (o e.g., the machine learning model). The encoder-decoder model 600 includes a starting data array 610, an encoder model 620, and a decoder model 620.

In some examples, the starting data array 610 represents the data array accessed by the data filtering circuitry 180 from the data retriever circuitry 170 (e.g., corresponding to the operations of block 410 of FIG. 4). The size (e.g., the number of indices) within the starting data array 610 is variable based on the complexity of the query, the amount of data available in the data host 120 to respond to the query, etc.

The encoder model 620, as described above, filters the starting data array 610 to reduce the amount of data the encoder model 620 must parse to find the desired response. The encoder model includes a plurality of layers 640, a filtering layer 650, a first-filtered data array 660, and a second-filtered data array 670.

As illustrated in FIG. 6A, the encoder model 620 includes 24 layers (e.g., layer 0 through layer 23). Each of the plurality of layers 640 is represented by the encoder model 620, and is a variable number based on the encoder model 620 being used by the data filtering circuitry 180. It should be understood that the illustrated encoder model 620 of FIG. 6A is one of many possible encoder models that could be used to accomplish the filtering out of unrelated data from the data array as described herein. Thus, the number of layers in the example encoder model 620 is meant to illustrate an example process in which an encoder model filters the data array.

The filtering layer 650 indicates the layers in which filtering is to occur, corresponding to the instructions of blocks 440 through 460 of FIG. 4. As illustrated in FIG. 6A, the example encoder model 620 includes at least two filtering layers 650. Based on the configuration calculated by the data selector circuitry 220 (corresponding to block 420 of FIG. 4), the number of filtering layers 650 is variable and may include more or less than shown in the example encoder model 620 of the illustrated example of FIG. 6A.

The first-filtered data array 660 of the illustrated example of FIG. 6A represents the starting data array 610 after filtering has been performed. In the examples disclosed herein, the amount of data (e.g., number of indices) removed from the starting data array 610 during the filtering process is variable based on Equation 5 mentioned above in reference to the data selector circuitry 220. In some examples, the first-filtered data array 660 may include less than half of the indices as compared to the starting data array 610. In other examples, the first-filtered data array may include more than half of the indices as compared to the starting data array 610.

The second-filtered data array 670 represents the first-filtered data array 660 after a second filtering has been performed. As stated above, the amount of data removed from the first-filtered data array 660 after the second filtering has been performed is variable based on the configuration calculated by the data selector circuitry 220. It should be understood that the illustrated example of FIG. 6A, although showing only two filtering points, may include any number of filtering points as defined in reference to Equations 1 through 5 above.

The decoder model 630 takes a final-filtered data array (e.g., the second-filtered data array 670 of the illustrated example of FIG. 6A) and decodes the final-filtered data array to produce the response. Once the response has been produced, the data filtering circuitry 180 then provides the response to the response receiver circuitry 160 and/or the storage 190.

Figure 6B:
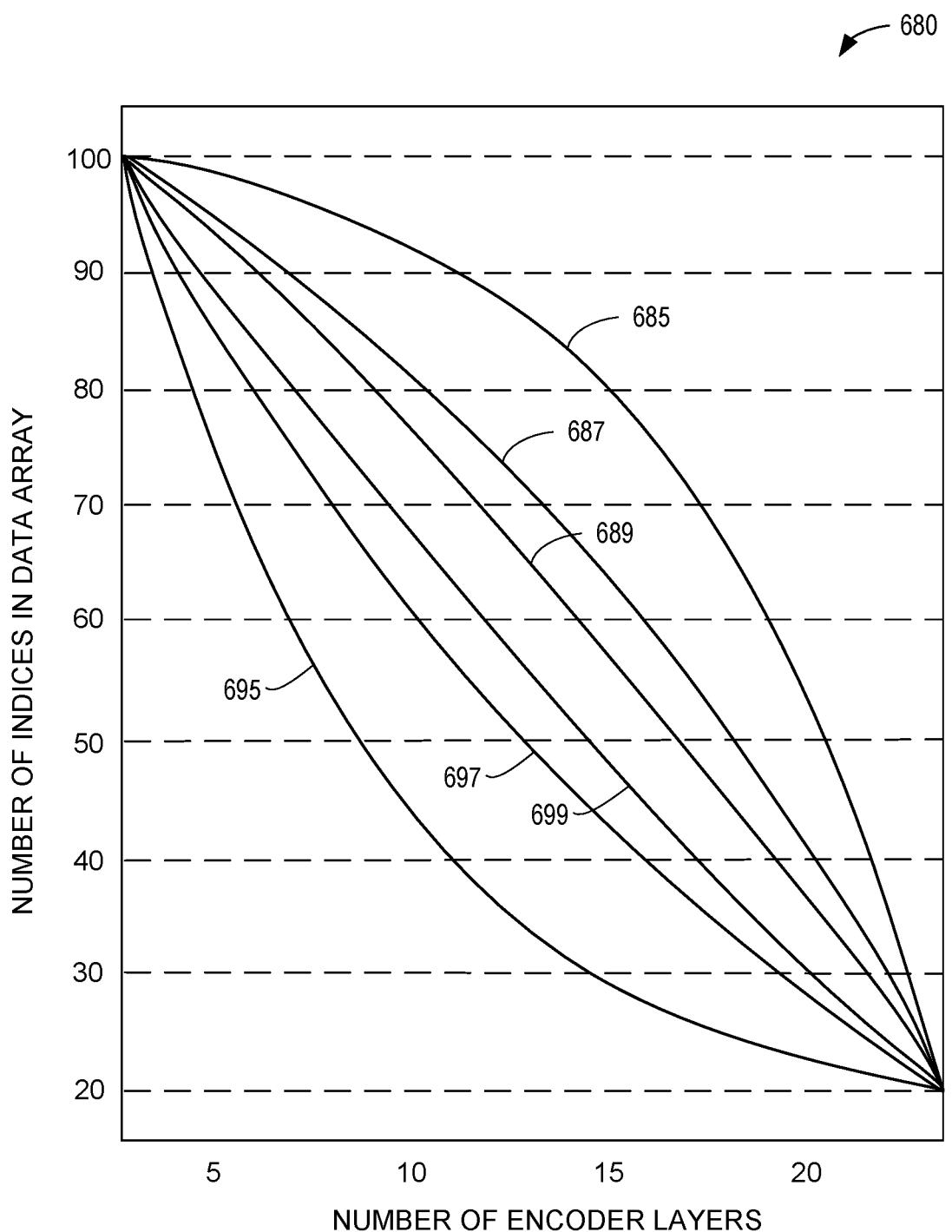
FIG. 6B shows an example graphical representation of the filtering process and filtering layer determination of FIGS. 4 and 6A.

FIG. 6B shows an example scaling/delay curve 680 to determine a filtering rate and the filtering layers of the encoder model 620 corresponding to the instructions of the data selector circuitry 220 of block 420. As shown in FIG. 6B, the scaling/decay can be adjusted by modifying the decay constant k. Negative k values (corresponding to curves 685, 687, 689) show that less data can be filtered out of the data array at the beginning layer of the encoder model 620 (e.g., a slower filtering rate). Specifically, where k=−2, −3, and −4, the −2 curve 685, −3 curve 687, and −4 curve 689 represent varying degrees of scaling/decay such that the closer the decay constant k is to zero, the slower the machine learning model will filter out data from the data array in the beginning layers of the encoder model 620.

Alternatively, positive k values (corresponding to curves 695, 697, 699) show that more data can be filtered out of the data array at the beginning layer of the encoder model 620 (e.g., a faster filtering rate). Specifically, where k=2, 3, and 4, the 2 curve 695, 3 curve 697, and 4 curve 699 represent varying degrees of scaling/decay such that the closer the decay constant k is to zero, the quicker the machine learning model will filter out data from the data array in the beginning layers of the encoder model 620.

As illustrated in FIG. 6B, the layer of the encoder model in which filtering can be done, as based on the output of Equation 5 above, can be determined by the example scaling/delay curve 680. As mentioned above, the output of Equation 5 provides the number of indices that must remain after the first filtering. With that determination, the machine learning model can determine which layer of the encoder model 620 corresponds to the amount of indices that must remain. For example, where k=2 (corresponding to the 2 curve 695) and Equation 5 determines that there must be 80 indices remaining (out of 100 total) after the first filtering, then the machine learning model can determine, based on the example scaling/delay curve 680, that the appropriate filtering layer is approximately layer five.

Figure 7:
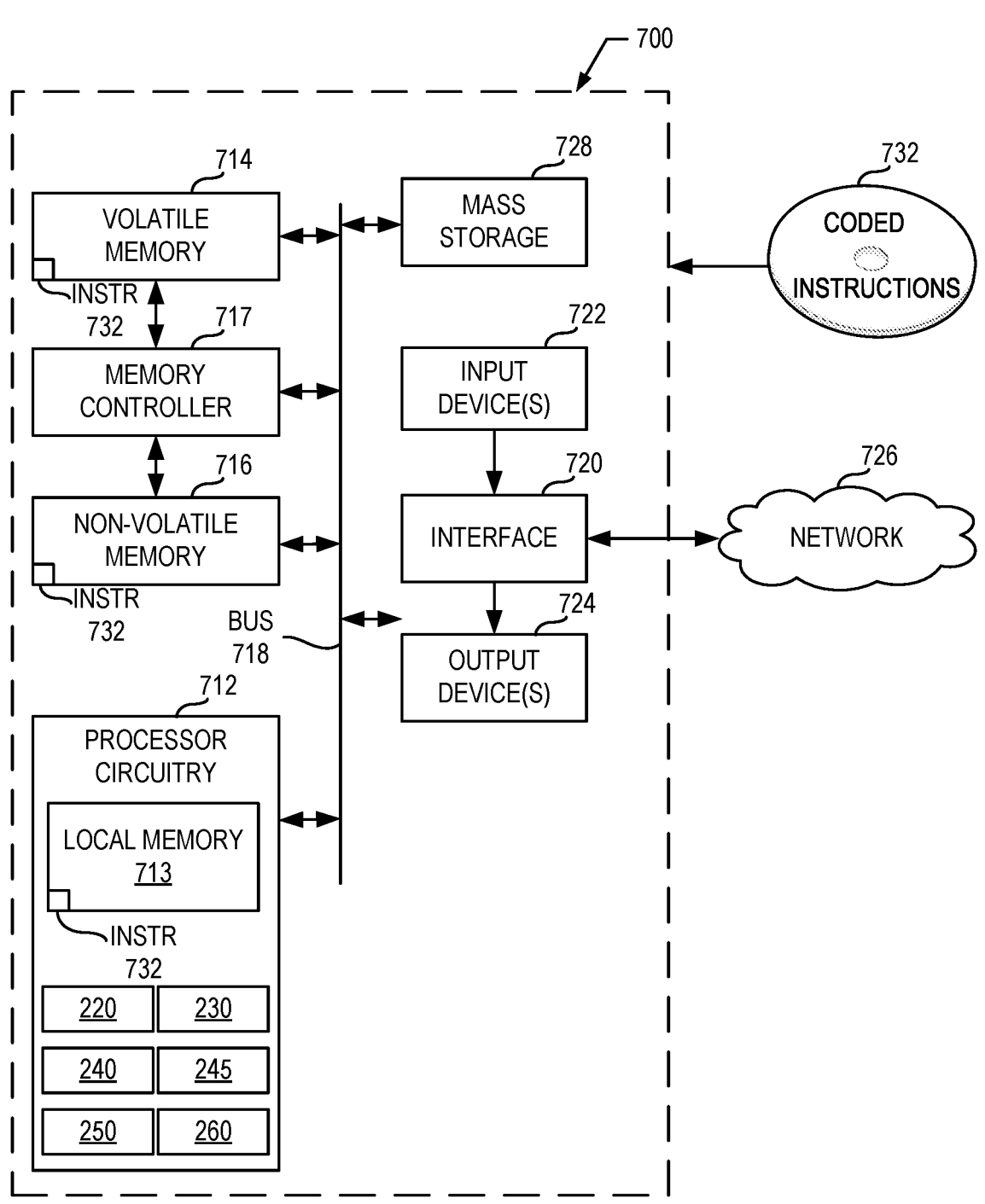
FIG. 7 is a block diagram of an example processing platform including processor circuitry structured to execute the example machine readable instructions and/or the example operations of FIGS. 3, 4, and/or 5 to implement the data filtering circuitry of FIG. 2.

FIG. 7 is a block diagram of an example processor platform 400 structured to execute and/or instantiate the machine readable instructions and/or the operations of FIGS. 3, 4, and/or 5 to implement the data filtering circuitry 180 of FIG. 2. The processor platform 700 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a gaming console, or any other type of computing device.

The processor platform 700 of the illustrated example includes processor circuitry 712. The processor circuitry 712 of the illustrated example is hardware. For example, the processor circuitry 712 can be implemented by one or more integrated circuits, logic circuits, FPGAs, microprocessors, CPUs, GPUs, DSPs, and/or microcontrollers from any desired family or manufacturer. The processor circuitry 712 may be implemented by one or more semiconductor based (e.g., silicon based) devices. In this example, the processor circuitry 712 implements the data selector circuitry 220, the data analysis circuitry 230, the scoring circuitry 240, the model training circuitry 250, and the response circuitry 260.

The processor circuitry 712 of the illustrated example includes a local memory 713 (e.g., a cache, registers, etc.). The processor circuitry 712 of the illustrated example is in communication with a main memory including a volatile memory 714 and a non-volatile memory 716 by a bus 718. The volatile memory 714 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 716 may be implemented by flash memory and/or any other desired type of memory device. Access to the main memory 714, 716 of the illustrated example is controlled by a memory controller 717.

The processor platform 700 of the illustrated example also includes interface circuitry 720. The interface circuitry 720 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 722 are connected to the interface circuitry 720. The input device(s) 722 permit(s) a user to enter data and/or commands into the processor circuitry 712. The input device(s) 722 can be implemented by, for example, an audio sensor, a microphone, a camera (still or video), a keyboard, a button, a mouse, a touchscreen, a track-pad, a trackball, an isopoint device, and/or a voice recognition system.

One or more output devices 724 are also connected to the interface circuitry 720 of the illustrated example. The output device(s) 724 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 720 of the illustrated example, thus, typically includes a graphics driver card, a graphics driver chip, and/or graphics processor circuitry such as a GPU.

The interface circuitry 720 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 726. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 700 of the illustrated example also includes one or more mass storage devices 728 to store software and/or data. Examples of such mass storage devices 728 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine readable instructions 732, which may be implemented by the machine readable instructions of FIGS. 3, 4, and/or 5, may be stored in the mass storage device 728, in the volatile memory 714, in the non-volatile memory 716, and/or on a removable non-transitory computer readable storage medium such as a CD or DVD.

Figure 8:
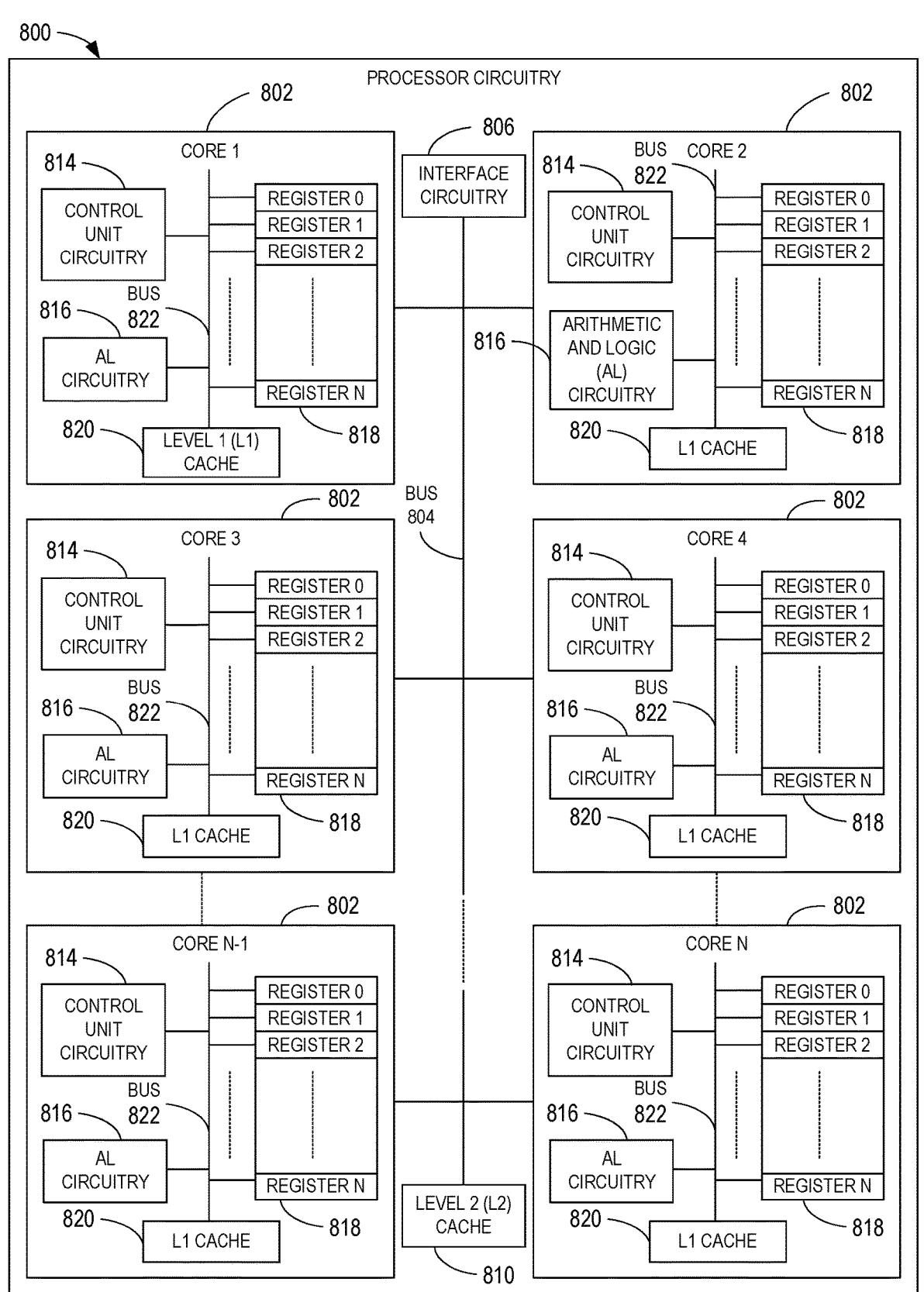
FIG. 8 is a block diagram of an example implementation of the processor circuitry of FIG. 7.

FIG. 8 is a block diagram of an example implementation of the processor circuitry 712 of FIG. 7. In this example, the processor circuitry 712 of FIG. 7 is implemented by a microprocessor 800. For example, the microprocessor 800 may be a general purpose microprocessor (e.g., general purpose microprocessor circuitry). The microprocessor 800 executes some or all of the machine readable instructions of the flowcharts of FIGS. 3, 4, and/or 5 to effectively instantiate the data filtering circuitry 180 of FIG. as logic circuits to perform the operations corresponding to those machine readable instructions. In some such examples, the data filtering circuitry 180 of FIG. 2 is instantiated by the hardware circuits of the microprocessor 800 in combination with the instructions. For example, the microprocessor 800 may be implemented by multi-core hardware circuitry such as a CPU, a DSP, a GPU, an XPU, etc. Although it may include any number of example cores 802 (e.g., 1 core), the microprocessor 800 of this example is a multi-core semiconductor device including N cores. The cores 802 of the microprocessor 800 may operate independently or may cooperate to execute machine readable instructions. For example, machine code corresponding to a firmware program, an embedded software program, or a software program may be executed by one of the cores 802 or may be executed by multiple ones of the cores 802 at the same or different times. In some examples, the machine code corresponding to the firmware program, the embedded software program, or the software program is split into threads and executed in parallel by two or more of the cores 802. The software program may correspond to a portion or all of the machine readable instructions and/or operations represented by the flowcharts of FIGS. 3, 4, and/or 5.

The cores 802 may communicate by a first example bus 804. In some examples, the first bus 804 may be implemented by a communication bus to effectuate communication associated with one(s) of the cores 802. For example, the first bus 804 may be implemented by at least one of an Inter-Integrated Circuit (I2C) bus, a Serial Peripheral Interface (SPI) bus, a PCI bus, or a PCIe bus. Additionally or alternatively, the first bus 804 may be implemented by any other type of computing or electrical bus. The cores 802 may obtain data, instructions, and/or signals from one or more external devices by example interface circuitry 806. The cores 802 may output data, instructions, and/or signals to the one or more external devices by the interface circuitry 806. Although the cores 802 of this example include example local memory 820 (e.g., Level 1 (L1) cache that may be split into an L1 data cache and an L1 instruction cache), the microprocessor 800 also includes example shared memory 810 that may be shared by the cores (e.g., Level 2 (L2 cache)) for high-speed access to data and/or instructions. Data and/or instructions may be transferred (e.g., shared) by writing to and/or reading from the shared memory 810. The local memory 820 of each of the cores 802 and the shared memory 810 may be part of a hierarchy of storage devices including multiple levels of cache memory and the main memory (e.g., the main memory 714, 716 of FIG. 7). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 802 may be referred to as a CPU, DSP, GPU, etc., or any other type of hardware circuitry. Each core 802 includes control unit circuitry 814, arithmetic and logic (AL) circuitry (sometimes referred to as an ALU) 816, a plurality of registers 818, the local memory 820, and a second example bus 822. Other structures may be present. For example, each core 802 may include vector unit circuitry, single instruction multiple data (SIMD) unit circuitry, load/store unit (LSU) circuitry, branch/jump unit circuitry, floating-point unit (FPU) circuitry, etc. The control unit circuitry 814 includes semiconductor-based circuits structured to control (e.g., coordinate) data movement within the corresponding core 802. The AL circuitry 816 includes semiconductor-based circuits structured to perform one or more mathematic and/or logic operations on the data within the corresponding core 802. The AL circuitry 816 of some examples performs integer based operations. In other examples, the AL circuitry 816 also performs floating point operations. In yet other examples, the AL circuitry 816 may include first AL circuitry that performs integer based operations and second AL circuitry that performs floating point operations. In some examples, the AL circuitry 816 may be referred to as an Arithmetic Logic Unit (ALU). The registers 818 are semiconductor-based structures to store data and/or instructions such as results of one or more of the operations performed by the AL circuitry 816 of the corresponding core 802. For example, the registers 818 may include vector register(s), SIMD register(s), general purpose register(s), flag register(s), segment register(s), machine specific register(s), instruction pointer register(s), control register(s), debug register(s), memory management register(s), machine check register(s), etc. The registers 818 may be arranged in a bank as shown in FIG. 8. Alternatively, the registers 818 may be organized in any other arrangement, format, or structure including distributed throughout the core 802 to shorten access time. The second bus 822 may be implemented by at least one of an I2C bus, a SPI bus, a PCI bus, or a PCIe bus Each core 802 and/or, more generally, the microprocessor 800 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 800 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 9:
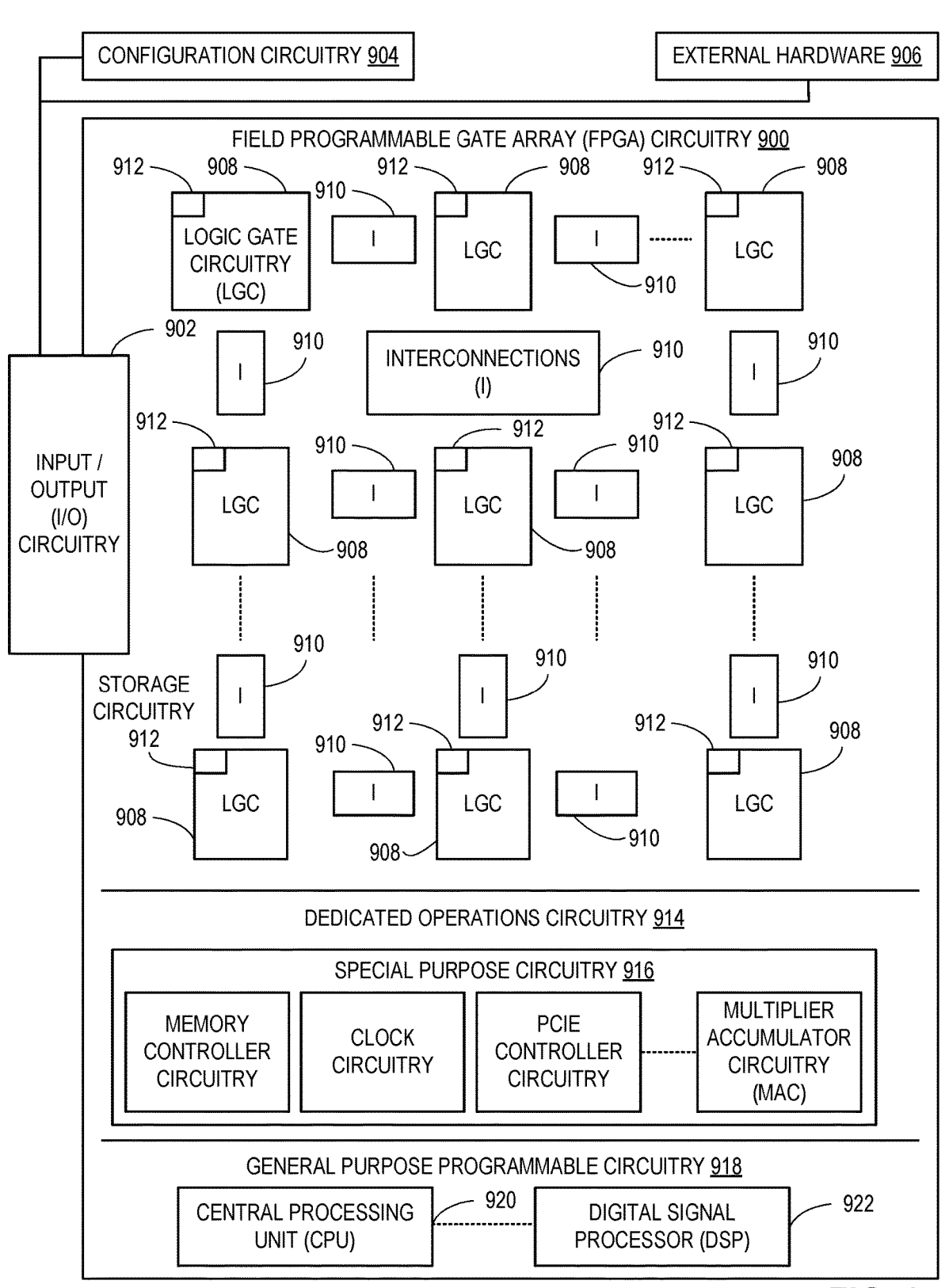
FIG. 9 is a block diagram of another example implementation of the processor circuitry of FIG. 7.

FIG. 9 is a block diagram of another example implementation of the processor circuitry 712 of FIG. 7. In this example, the processor circuitry 712 is implemented by FPGA circuitry 900. For example, the FPGA circuitry 900 may be implemented by an FPGA. The FPGA circuitry 900 can be used, for example, to perform operations that could otherwise be performed by the example microprocessor 800 of FIG. 8 executing corresponding machine readable instructions. However, once configured, the FPGA circuitry 900 instantiates the machine readable instructions in hardware and, thus, can often execute the operations faster than they could be performed by a general purpose microprocessor executing the corresponding software.

More specifically, in contrast to the microprocessor 800 of FIG. 8 described above (which is a general purpose device that may be programmed to execute some or all of the machine readable instructions represented by the flowcharts of FIGS. 3, 4, and/or 5 but whose interconnections and logic circuitry are fixed once fabricated), the FPGA circuitry 900 of the example of FIG. 9 includes interconnections and logic circuitry that may be configured and/or interconnected in different ways after fabrication to instantiate, for example, some or all of the machine readable instructions represented by the flowcharts of FIGS. 3, 4, and/or 5. In particular, the FPGA circuitry 900 may be thought of as an array of logic gates, interconnections, and switches. The switches can be programmed to change how the logic gates are interconnected by the interconnections, effectively forming one or more dedicated logic circuits (unless and until the FPGA circuitry 900 is reprogrammed). The configured logic circuits enable the logic gates to cooperate in different ways to perform different operations on data received by input circuitry. Those operations may correspond to some or all of the software represented by the flowcharts of FIGS. 3, 4, and/or 5. As such, the FPGA circuitry 900 may be structured to effectively instantiate some or all of the machine readable instructions of the flowcharts of FIGS. 3, 4, and/or 5 as dedicated logic circuits to perform the operations corresponding to those software instructions in a dedicated manner analogous to an ASIC. Therefore, the FPGA circuitry 900 may perform the operations corresponding to the some or all of the machine readable instructions of FIGS. 3, 4, and/or 5 faster than the general purpose microprocessor can execute the same.

In the example of FIG. 9, the FPGA circuitry 900 is structured to be programmed (and/or reprogrammed one or more times) by an end user by a hardware description language (HDL) such as Verilog. The FPGA circuitry 900 of FIG. 9, includes example input/output (I/O) circuitry 902 to obtain and/or output data to/from example configuration circuitry 904 and/or external hardware 909. For example, the configuration circuitry 904 may be implemented by interface circuitry that may obtain machine readable instructions to configure the FPGA circuitry 900, or portion(s) thereof. In some such examples, the configuration circuitry 904 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 906 may be implemented by external hardware circuitry. For example, the external hardware 906 may be implemented by the microprocessor 800 of FIG. 8. The FPGA circuitry 900 also includes an array of example logic gate circuitry 908, a plurality of example configurable interconnections 910, and example storage circuitry 912. The logic gate circuitry 908 and the configurable interconnections 910 are configurable to instantiate one or more operations that may correspond to at least some of the machine readable instructions of FIGS. 3, 4, and/or 5 and/or other desired operations. The logic gate circuitry 908 shown in FIG. 9 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 908 to enable configuration of the electrical structures and/or the logic gates to form circuits to perform desired operations. The logic gate circuitry 908 may include other electrical structures such as look-up tables (LUTs), registers (e.g., flip-flops or latches), multiplexers, etc.

The configurable interconnections 910 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 908 to program desired logic circuits.

The storage circuitry 912 of the illustrated example is structured to store result(s) of the one or more of the operations performed by corresponding logic gates. The storage circuitry 912 may be implemented by registers or the like. In the illustrated example, the storage circuitry 912 is distributed amongst the logic gate circuitry 908 to facilitate access and increase execution speed.

The example FPGA circuitry 900 of FIG. 9 also includes example Dedicated Operations Circuitry 914. In this example, the Dedicated Operations Circuitry 914 includes special purpose circuitry 916 that may be invoked to implement commonly used functions to avoid the need to program those functions in the field. Examples of such special purpose circuitry 916 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 900 may also include example general purpose programmable circuitry 918 such as an example CPU 920 and/or an example DSP 922. Other general purpose programmable circuitry 918 may additionally or alternatively be present such as a GPU, an XPU, etc., that can be programmed to perform other operations.

Although FIGS. 8 and 9 illustrate two example implementations of the processor circuitry 712 of FIG. 7, many other approaches are contemplated. For example, as mentioned above, modern FPGA circuitry may include an on-board CPU, such as one or more of the example CPU 920 of FIG. 9. Therefore, the processor circuitry 712 of FIG. 7 may additionally be implemented by combining the example microprocessor 800 of FIG. 8 and the example FPGA circuitry 900 of FIG. 9. In some such hybrid examples, a first portion of the machine readable instructions represented by the flowcharts of FIGS. 3, 4, and/or 5 may be executed by one or more of the cores 802 of FIG. 8, a second portion of the machine readable instructions represented by the flowcharts of FIGS. 3, 4, and/or 5 may be executed by the FPGA circuitry 900 of FIG. 9, and/or a third portion of the machine readable instructions represented by the flowcharts of FIGS. 3, 4, and/or 5 may be executed by an ASIC. It should be understood that some or all of the data filtering circuitry 180 of FIG. 2 may, thus, be instantiated at the same or different times. Some or all of the circuitry may be instantiated, for example, in one or more threads executing concurrently and/or in series. Moreover, in some examples, some or all of the data filtering circuitry 180 of FIG. 2 may be implemented within one or more virtual machines and/or containers executing on the microprocessor.

In some examples, the processor circuitry 712 of FIG. 7 may be in one or more packages. For example, the microprocessor 800 of FIG. 8 and/or the FPGA circuitry 900 of FIG. 9 may be in one or more packages. In some examples, an XPU may be implemented by the processor circuitry 712 of FIG. 7, which may be in one or more packages. For example, the XPU may include a CPU in one package, a DSP in another package, a GPU in yet another package, and an FPGA in still yet another package.

Figure 10:
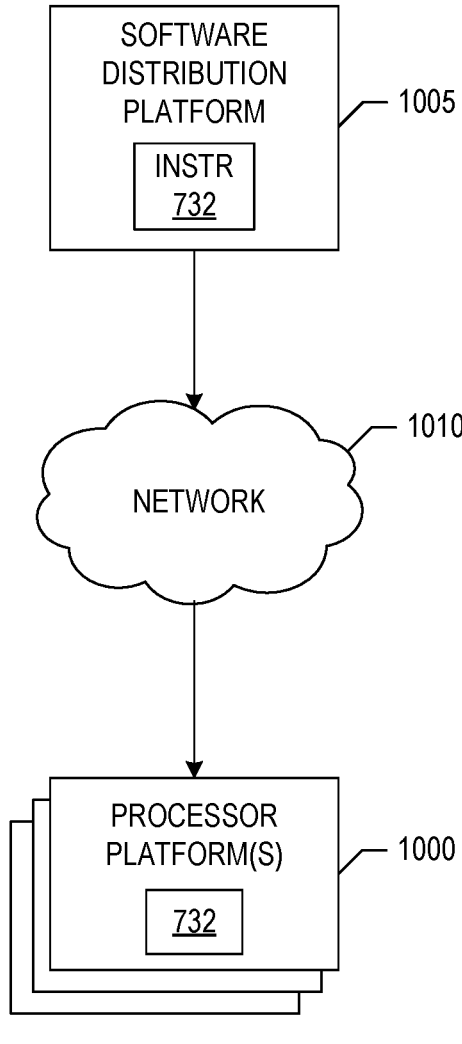
FIG. 10 is a block diagram of an example software distribution platform (e.g., one or more servers) to distribute software (e.g., software corresponding to the example machine readable instructions of FIGS. 3, 4, and/or 5) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1005 to distribute software such as the example machine readable instructions 732 of FIG. 7 to hardware devices owned and/or operated by third parties is illustrated in FIG. 10. The example software distribution platform 1005 may be implemented by any computer server, data facility, cloud service, etc., capable of storing and transmitting software to other computing devices. The third parties may be customers of the entity owning and/or operating the software distribution platform 1005. For example, the entity that owns and/or operates the software distribution platform 1005 may be a developer, a seller, and/or a licensor of software such as the example machine readable instructions 732 of FIG. 7. The third parties may be consumers, users, retailers, OEMs, etc., who purchase and/or license the software for use and/or re-sale and/or sublicensing. In the illustrated example, the software distribution platform 1005 includes one or more servers and one or more storage devices. The storage devices store the machine readable instructions 732, which may correspond to the example machine readable instructions 300, 400, and/or 500 of FIGS. 3, 4, and/or 5, as described above. The one or more servers of the example software distribution platform 1005 are in communication with an example network 1010, which may correspond to any one or more of the Internet and/or any of the example networks 726 described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 732 from the software distribution platform 1005. For example, the software, which may correspond to the example machine readable instructions 300, 400, and/or 500 of FIGS. 3, 4, and/or 5, may be downloaded to the example processor platform 700, which is to execute the machine readable instructions 732 to implement the data filtering circuitry 180. In some examples, one or more servers of the software distribution platform 1005 periodically offer, transmit, and/or force updates to the software (e.g., the example machine readable instructions 732 of FIG. 7) to ensure improvements, patches, updates, etc., are distributed and applied to the software at the end user devices.

From the foregoing, it will be appreciated that example systems, methods, apparatus, and articles of manufacture have been disclosed that reduces latency in reader-retriever architectures by continuously filtering out irrelevant/unrelated data from the data sample. Disclosed systems, methods, apparatus, and articles of manufacture improve the efficiency of using a computing device by reducing the amount of data the reader-retriever architecture must parse by variably filtering out data irrelevant to the query. Disclosed systems, methods, apparatus, and articles of manufacture are accordingly directed to one or more improvement(s) in the operation of a machine such as a computer or other electronic and/or mechanical device.

Example methods, apparatus, systems, and articles of manufacture for reduction of latency in retriever-reader architectures are disclosed herein. Further examples and combinations thereof include the following:

Example 1 includes an apparatus to reduce latency in a retriever-reader architecture comprising at least one memory, machine readable instructions, and processor circuitry to at least one of instantiate or execute the machine readable instructions to identify a query, the query having data associated with the query, create a data array based on the data associated with the query, and deploy a machine learning model to assign a score to an index of the data array based on a likelihood that a response to the query exists in the index, determine an action to perform on the index based on a comparison of the score and a ranking threshold, and produce the response from the data array based on the action.

Example 2 includes the apparatus of example 1, wherein to determine an action to perform on the index includes removing the index from the data array.

Example 3 includes the apparatus of example 2, wherein the removing of the index occurs based on a determination that the score does not meet the ranking threshold.

Example 4 includes the apparatus of example 2, wherein the processor circuitry is further to reduce a size of the data array after removing the index.

Example 5 includes the apparatus of example 1, wherein the processor circuitry is further to identify at least one filtering layer of an encoder of the retriever-reader architecture, and perform the action on the index based on the identified filtering layer.

Example 6 includes the apparatus of example 5, wherein the processor circuitry is further to determine a filtering rate based on a decay function for the identified filtering layer of the encoder.

Example 7 includes the apparatus of example 5, wherein processor circuitry is to utilize a decay function to identify the at least one filtering layer of the encoder.

Example 8 includes the apparatus of example 1, wherein processor circuitry is further to produce the response by utilizing a decoder of the retriever-reader architecture to decode the data array.

Example 9 includes the apparatus of example 1, wherein the processor circuitry is further to update the machine learning model based on the response produced.

Example 10 includes at least one machine readable storage medium comprising instructions that, when executed, cause processor circuitry to at least identify a query, the query having data associated with the query, create a data array based on data associated with the query, assign a score to an index of the data array based on a likelihood that a response to the query exists in the index, determine an action to perform on the index based on a comparison of the score and a ranking threshold, and produce the response from the data array based on the action. In some examples the machine readable storage medium is a non-transitory machine readable storage medium.

Example 11 includes the at least one machine readable storage medium of example 10, wherein the instructions, when executed, further cause the processor circuitry to remove the index from the data array based on a determination that the score does not meet the ranking threshold.

Example 12 includes the at least one machine readable storage medium of example 11, wherein the instructions, when executed, further cause the processor circuitry to reduce a size of the data array after removing the index.

Example 13 includes the at least one machine readable storage medium of example 10, wherein the instructions, when executed, further cause the processor circuitry to identify at least one filtering layer of an encoder of a retriever-reader architecture, the processor circuitry to perform the action on the index based on the identified filtering layer.

Example 14 includes the at least one machine readable storage medium of example 13, wherein the instructions, when executed, further cause the processor circuitry to determine a filtering rate based on a decay function for the identified filtering layer of the encoder.

Example 15 includes the at least one machine readable storage medium of example 13, wherein the instructions, when executed, further cause the processor circuitry to utilize a decay function to identify the at least one filtering layer of the encoder.

Example 16 includes the at least one machine readable storage medium of example 10, wherein the instructions, when executed, further cause the processor circuitry to produce the response by utilizing a decoder of a retriever-reader architecture to decode the data array.

Example 17 includes the at least one machine readable storage medium of example 10, wherein the instructions, when executed, further cause the processor circuitry to update a machine learning model based on the response produced.

Example 18 includes an apparatus to reduce latency in a reader-retriever architecture comprising means for accessing a data array, the data array including data associated with a query, means for assigning a score to an index of the data array based on a likelihood that a response to the query exists in the index, means for removing the index from the data array based on the score assigned to the index, and means for producing the response from the data array based on the removing means.

Example 19 includes the apparatus of example 18, wherein the means for removing is to remove the index based on a determination that the score does not meet a ranking threshold.

Example 20 includes the apparatus of example 18, wherein the means for removing is to reduce a size of the data array after removing the index.

Example 21 includes the apparatus of example 18, wherein the means for accessing is to identify at least one filtering layer of an encoder of the retriever-reader architecture.

Example 22 includes the apparatus of example 21, wherein the means for removing is to determine a filtering rate based on a decay function for the identified filtering layer of the encoder.

Example 23 includes the apparatus of example 21, wherein means for accessing is to utilize a decay function to identify the at least one filtering layer of the encoder.

Example 24 includes the apparatus of example 18, wherein the means for producing the response is to utilize a decoder of a retriever-reader architecture to decode the data array.

Example 25 includes the apparatus of example 18, further including means for updating a machine learning model based on the response produced.

Example 26 includes a method for reducing latency in a reader-retriever architecture using a machine learning model comprising creating, by executing an instruction with at least one processor, a data array based on data associated with a query, assigning a score to an index of the data array based on a likelihood that a response to the query exists in the index, determining, by executing an instruction with at least one processor, an action to perform on the index based on a comparison of the score and a ranking threshold, and producing the response from the data array based on the action.

Example 27 includes the method of example 26, further including identifying the query.

Example 28 includes the method of example 26, further including outputting the response.

Example 29 includes the method of example 26, further including removing the index from the data array based on a determination that the score does not meet the ranking threshold.

Example 30 includes the method of example 29, further including reducing a size of the data array after removing the index.

Example 31 includes the method of example 26, further including identifying at least one filtering layer of an encoder of the retriever-reader architecture, the action to perform on the index occurring based on the identified filtering layer.

Example 32 includes the method of example 31, further including determining a filtering rate based on a decay function for the identified filtering layer of the encoder.

Example 33 includes the method of example 31, wherein the identifying of the at least one filtering layer is accomplished by using a decay function.

Example 34 includes the method of example 26, further including decoding, using a decoder of the retriever-reader architecture, the data array to produce the response.

Example 35 includes the method of example 26, further including updating the machine learning model based on the producing of the response. The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. An apparatus to reduce latency in a retriever-reader architecture comprising:
   at least one memory;
   machine readable instructions; and
   at least one programmable circuit to at least one of instantiate or execute the machine readable instructions to:
      identify a query, the query having data associated with the query;
      create a data array based on the data associated with the query; and
      deploy a machine learning model including a plurality of encoder layers, the machine learning model to at least:
         assign a score to an index of the data array based on a likelihood that a response to the query exists in the index;
         filter, at one or more of the plurality of encoder layers, the data array by removal of the index from the data array based on a comparison of the score and a layer-specific ranking threshold, the layer-specific ranking threshold determined based on a filtering rate for the encoder layer; and
         produce the response from the data array after the filtering.

2. The apparatus of claim 1, wherein one or more of the at least one programmable circuit is to reduce a size of the data array after removal of the index.

3. The apparatus of claim 1, wherein one or more of the at least one programmable circuit is to determine the filtering rate based on a decay function for the identified encoder layer.

4. The apparatus of claim 1, wherein one or more of the at least one programmable circuit is to utilize a decay function to identify the encoder layer.

5. The apparatus of claim 1, wherein one or more of the at least one programmable circuit is to produce the response by utilizing a decoder of the retriever-reader architecture to decode the data array.

6. The apparatus of claim 1, wherein the one or more of the at least one programmable circuit is to update the machine learning model based on the response produced.

7. The apparatus of claim 1, wherein the filtering rate differs between at least two of the plurality of encoder layers.

8. The apparatus of claim 1, wherein the layer-specific ranking threshold increases or decreases monotonically across successive encoder layers.

9. The apparatus of claim 1, wherein the filtering rate controls an extent of index removal independently of the comparison of the score and the layer-specific ranking threshold.

10. The apparatus of claim 1, wherein the filtering rate specifies a proportion of indices removed from the data array at a respective encoder layer.

11. At least one non-transitory machine readable storage medium comprising instructions that, when executed, cause processor circuitry to at least:
   identify a query, the query having data associated with the query;
   create a data array based on data associated with the query;
   assign a score to an index of the data array based on a likelihood that a response to the query exists in the index;
   filter, at one or more of a plurality of encoder layers of a machine learning model, the data array by removal of the index from the data array based on a comparison of the assigned score and a layer-specific ranking threshold, the layer-specific ranking threshold determined based on a filtering rate for the encoder layer; and
   produce the response from the data array after filtering.

12. The at least one non-transitory machine readable storage medium of claim 11, wherein the instructions, when executed, further cause the processor circuitry to reduce a size of the data array after removal of the index.

13. The at least one non-transitory machine readable storage medium of claim 11, wherein the instructions, when executed, further cause the processor circuitry to determine the filtering rate based on a decay function for the identified encoder layer.

14. The at least one non-transitory machine readable storage medium of claim 11, wherein the instructions, when executed, further cause the processor circuitry to utilize a decay function to identify the encoder layer.

15. The at least one non-transitory machine readable storage medium of claim 11, wherein the instructions, when executed, further cause the processor circuitry to produce the response by utilizing a decoder of a retriever-reader architecture to decode the data array.

16. The at least one non-transitory machine readable storage medium of claim 11, wherein the instructions, when executed, further cause the processor circuitry to update the machine learning model based on the response produced.

17. The at least one non-transitory machine readable storage medium of claim 11, wherein the instructions, when executed, cause the processor circuitry to utilize a filtering rate that differs between at least two of the plurality of encoder layers.

18. The at least one non-transitory machine readable storage medium of claim 11, wherein the instructions, when executed, cause the processor circuitry to utilize a layer-specific ranking threshold that increases or decreases monotonically across successive encoder layers.

19. The at least one non-transitory machine readable storage medium of claim 11, wherein the instructions, when executed, cause the processor circuitry to control an extent of index removal using the filtering rate independently of the comparison of the assigned score and the layer-specific ranking threshold.

20. An apparatus to reduce latency in a reader-retriever architecture comprising:
   means for accessing a data array, the data array including data associated with a query;

means for assigning a score to an index of the data array based on a likelihood that a response to the query exists in the index;

means for removing the index, at one or more of a plurality of encoder layers of a machine learning model, from the data array based on a comparison of the assigned score and a layer-specific ranking threshold, the layer-specific ranking threshold determined based on a filtering rate for the encoder layer; and means for producing the response from the data array after filtering.

21. The apparatus of claim 20, wherein the means for removing is to reduce a size of the data array after removing the index.

22. The apparatus of claim 20, wherein the means for accessing is to identify at least one filtering layer of an encoder of the machine learning model.

23. A method for reducing latency in a reader-retriever architecture using a machine learning model comprising:

creating, by executing an instruction with at least one processor, a data array based on data associated with a query;

assigning a score to an index of the data array based on a likelihood that a response to the query exists in the index;

filtering, by executing an instruction with at least one processor, at one or more of a plurality of encoder layers of a machine learning model, the data array by removal of the index from the data array based on a comparison of the assigned score and a layer-specific ranking threshold, the layer-specific ranking threshold determined based on a filtering rate for the encoder layer; and producing the response from the data array after filtering.

24. The method of claim 23, further including reducing a size of the data array after removal of the index.

25. The method of claim 23, further including identifying at least one filtering layer of an encoder of the machine learning model.

* * * * *